(12) United States Patent
Takeuchi et al.

(10) Patent No.: US 12,347,403 B2
(45) Date of Patent: Jul. 1, 2025

(54) TRANSISTOR, CIRCUIT SUBSTRATE, AND DISPLAY DEVICE

(71) Applicant: Sharp Display Technology Corporation, Kameyama (JP)

(72) Inventors: Yohei Takeuchi, Kameyama (JP); Tatsuya Kawasaki, Kameyama (JP); Kengo Hara, Kameyama (JP); Masafumi Sugino, Kameyama (JP); Hajime Imai, Kameyama (JP); Tohru Daitoh, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 18/585,148

(22) Filed: Feb. 23, 2024

(65) Prior Publication Data

US 2024/0331653 A1 Oct. 3, 2024

(30) Foreign Application Priority Data

Mar. 28, 2023 (JP) .................................. 2023-051378

(51) Int. Cl.
*G09G 3/36* (2006.01)
*G02F 1/1362* (2006.01)
*G02F 1/1368* (2006.01)

(52) U.S. Cl.
CPC ..... *G09G 3/3677* (2013.01); *G02F 1/136286* (2013.01); *G02F 1/1368* (2013.01); *G09G 2310/0286* (2013.01); *G09G 2310/08* (2013.01)

(58) Field of Classification Search
CPC ............. G02F 1/136286; G02F 1/1368; G02F 1/13685; G09G 3/3677
See application file for complete search history.

(56) References Cited

U.S. PATENT DOCUMENTS

| | | | | |
|---|---|---|---|---|
| 6,639,281 B2 * | 10/2003 | Kane | ...................... | G02F 1/1368 257/350 |
| 7,411,638 B2 * | 8/2008 | Kim | ...................... | H10D 86/441 257/E27.111 |
| 8,591,650 B2 * | 11/2013 | Toriumi | ................ | C30B 25/105 117/108 |
| 10,644,120 B2 * | 5/2020 | He | ...................... | H10D 30/0316 |

(Continued)

FOREIGN PATENT DOCUMENTS

JP 2010-258423 A 11/2010

*Primary Examiner* — Sardis F Azongha
(74) *Attorney, Agent, or Firm* — Keating & Bennett, LLP

(57) ABSTRACT

A transistor includes a first electrode, a first semiconductor portion that is at least partly superimposed on the first electrode and that is composed of a semiconductor material, a first insulating film that is interposed between the first electrode and the first semiconductor portion, a second electrode that is superimposed on a part of the first semiconductor portion and that is connected to the first semiconductor portion, and a third electrode that is located in a layer in which the second electrode is located, that is superimposed on a part of the first semiconductor portion, and that is connected to the first semiconductor portion. An electric potential of the second electrode is lower than that of the third electrode. The third electrode includes a first portion that is spaced from the second electrode and a second portion that is spaced from the second electrode opposite the first portion.

8 Claims, 14 Drawing Sheets

(56) References Cited

U.S. PATENT DOCUMENTS

| | | | |
|---|---|---|---|
| 2009/0109162 A1* | 4/2009 | Moon | H10D 30/0316 |
| | | | 345/100 |
| 2010/0244031 A1 | 9/2010 | Akimoto et al. | |
| 2015/0138466 A1* | 5/2015 | Mori | G02F 1/136213 |
| | | | 349/38 |
| 2021/0333608 A1* | 10/2021 | Yao | G02F 1/136286 |
| 2024/0185810 A1* | 6/2024 | He | H10D 30/6729 |

* cited by examiner

TRANSISTOR, CIRCUIT SUBSTRATE, AND DISPLAY DEVICE

BACKGROUND

1. Field

The present disclosure relates to a transistor, a circuit substrate, and a display device.

2. Description of the Related Art

An example of an existing transistor that is included in, for example, a liquid crystal panel is disclosed in Japanese Unexamined Patent Application Publication No. 2010-258423. As for the transistor disclosed in Japanese Unexamined Patent Application Publication No. 2010-258423, end portions of a first wiring layer and a second wiring layer having high conductivity do not overlap a gate electrode layer. Consequently, the phenomenon of concentration of an electric field near a first electrode layer and a second electrode layer is alleviated, and a hot carrier is inhibited from occurring. In addition, the first electrode layer and the second electrode layer that have resistivity higher than that of the first wiring layer and the second wiring layer are used as a drain electrode layer.

As for the transistor disclosed in Japanese Unexamined Patent Application Publication No. 2010-258423 described above, a source electrode has a multilayer structure of the first wiring layer and the first electrode layer, and a drain electrode has a multiplayer structure of the second wiring layer and the second electrode layer. For this reason, a semiconductor layer that is stacked at upper layers of the first wiring layer and the second wiring layer has a step, and a failure such as a cut film is likely to occur due to the step. As a result, a problem such as a poor yield is concerned.

It is desirable to ensure a good yield and to inhibit a hot carrier from occurring.

SUMMARY

According to an aspect of the disclosure, there is provided a transistor including a first electrode, a first semiconductor portion that is at least partly superimposed on the first electrode and that is composed of a semiconductor material, a first insulating film that is interposed between the first electrode and the first semiconductor portion, a second electrode that is superimposed on a part of the first semiconductor portion and that is connected to the first semiconductor portion, and a third electrode that is located in a layer in which the second electrode is located, that is superimposed on a part of the first semiconductor portion, and that is connected to the first semiconductor portion. An electric potential of the second electrode is lower than that of the third electrode. The third electrode includes a first portion that is spaced from the second electrode and a second portion that is spaced from the second electrode opposite the first portion.

DESCRIPTION OF THE EMBODIMENTS

First Embodiment

A first embodiment will be described with reference to FIG. 1 to FIG. 7. According to the present embodiment, a liquid crystal panel (a display device) 10 will be described by way of example. In some of the figures, an X-axis, a Y-axis, and a Z-axis are illustrated, and axial directions coincide with directions illustrated in the figures.

Figure 1:
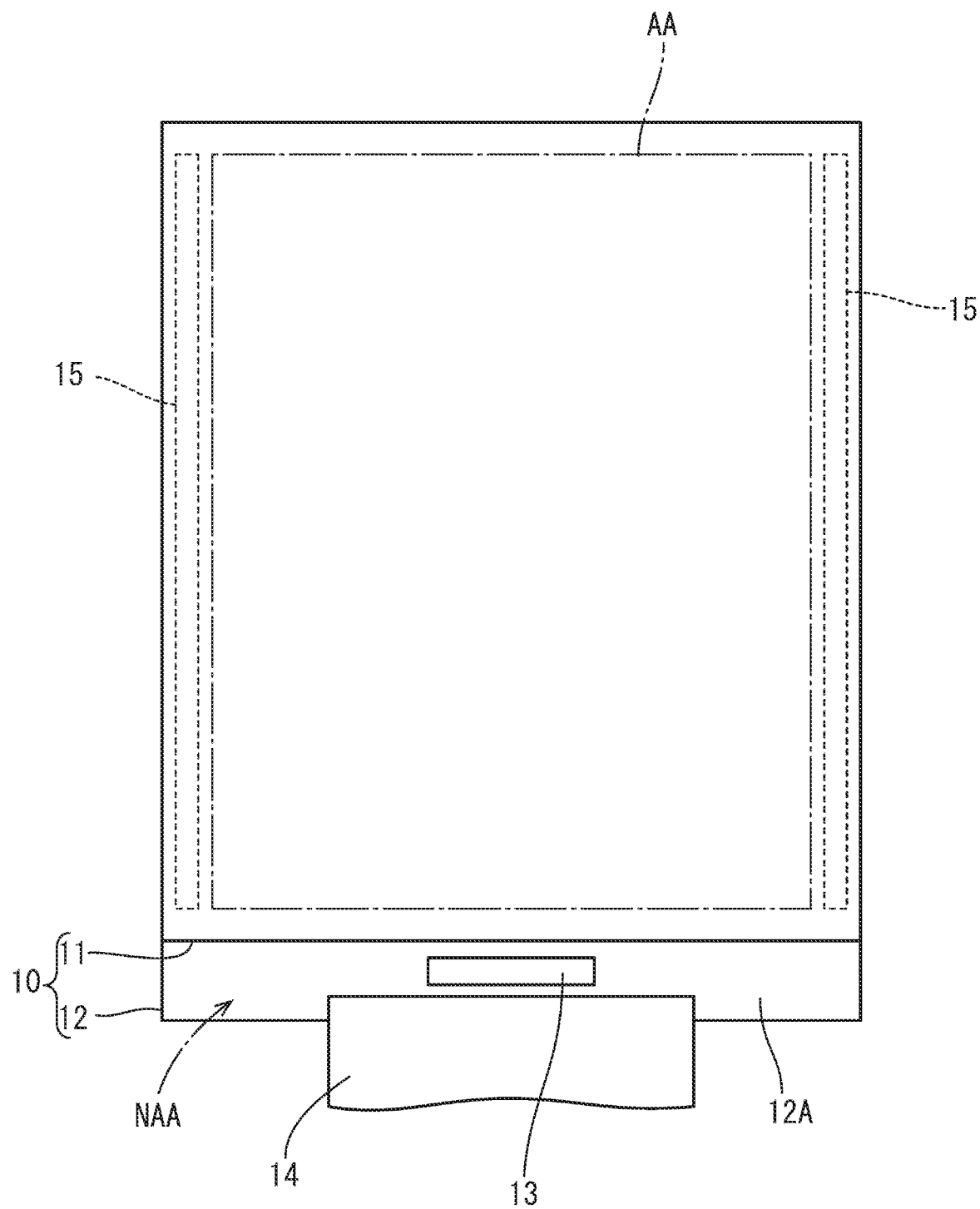
FIG. 1 is a plan view of a liquid crystal panel according to a first embodiment.

As illustrated in FIG. 1, a planar shape of the liquid crystal panel 10 according to the present embodiment is a rectangular shape elongated in the vertical direction. As for the liquid crystal panel 10, a short-side direction coincides with an X-axis direction, a long-side direction coincides with a Y-axis direction, and a thickness direction coincides with a Z-axis direction. The liquid crystal panel 10 can display an image by using illumination light that is emitted from a backlight device (an illumination device). As for the liquid crystal panel 10, a central portion of a screen corresponds to a display region (a pixel region) AA in which the image is displayed. As for the liquid crystal panel 10, a frame-shaped outer circumferential portion that surrounds the display region AA of the screen corresponds to a non-display region (a picture frame region) NAA in which no image is displayed. In FIG. 1, a range that is surrounded by a one-dot chain line corresponds to the display region AA.

As illustrated in FIG. 1, the liquid crystal panel 10 has a structure in which a liquid crystal layer that contains liquid crystal molecules that are substances that have optical characteristics changeable due to an applied electric field is sandwiched between two substrates 11 and 12 that are substantially transparent, that have excellent translucency, and that are composed of glass. Of the two substrates 11 and 12, a front substrate is referred to as the facing substrate 11, and a back substrate is referred to as the array substrate (the circuit substrate) 12. The facing substrate 11 and the array substrate 12 are formed in a manner in which various films are stacked on inner surfaces of glass substrates. As for the array substrate 12, the dimensions of long sides are larger than the dimensions of long sides of the facing substrate 11, and an end portion in the long-side direction is a projecting portion 12A that projects sideways from the facing substrate 11. The projecting portion 12A is not covered by the facing substrate 11 but is exposed. The whole of the projecting portion 12A has the non-display region NAA, and a driver 13 for supplying various signals and a flexible substrate 14 are mounted thereon.

The driver 13 includes an LSI chip that contains a drive circuit. The driver 13 is mounted on the projecting portion 12A of the array substrate 12 by using a chip-on-glass (COG) method. The driver 13 is adjacent to the display region AA in the Y-axis direction and is sandwiched between the flexible substrate 14 and the display region AA. A planar shape of the driver 13 is a rectangular shape elongated in the transverse direction. The driver 13 processes various signals that are transmitted by the flexible substrate 14. The flexible substrate 14 has a large number of wiring line patterns that are formed on an insulating flexible base material. As for the flexible substrate 14, an end thereof is connected to the array substrate 12, and another end is connected to an external control substrate (a signal supply source). Various signals that are supplied from the control substrate are transmitted to the liquid crystal panel 10 via the flexible substrate 14.

As illustrated in FIG. 1, two gate circuits (gate driver monolithic (GDM) circuits) 15 are provided in the non-display region NAA of the array substrate 12 so as to sandwich the display region AA therebetween in the X-axis direction. The gate circuits 15 are provided within belt-like ranges that extend in the Y-axis direction. The gate circuits 15 are used to supply scanning signals to gate wiring lines 16 described later and are monolithically provided on the array substrate 12. For example, the gate circuits 15 include shift register circuits that output the scanning signals with a predetermined timing and buffer circuits for amplify the scanning signals. Specific circuit structures of the gate circuits 15 will be described in detail later.

Figure 2:
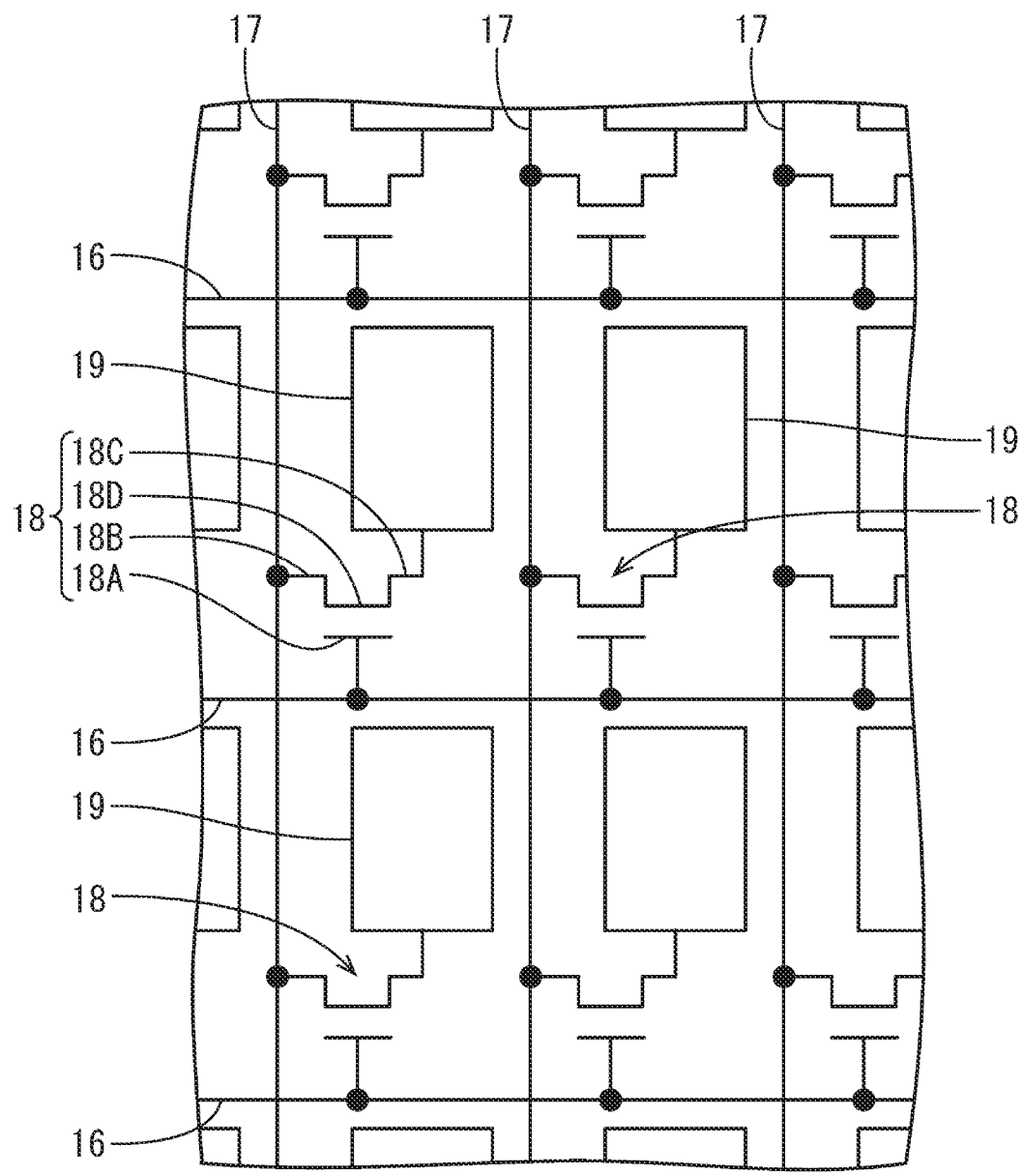
FIG. 2 is a circuit diagram illustrating pixel arrangement in a display region of an array substrate that is included in the liquid crystal panel according to the first embodiment.

The outline of pixel arrangement in the display region AA of the array substrate 12 will be described with reference to FIG. 2. As illustrated in FIG. 2, the multiple gate wiring lines (the scanning wiring lines) 16 and multiple source wiring lines (signal wiring lines, or data wiring lines) 17 that are formed into a lattice are arranged on an inner surface of the array substrate 12 in the display region AA. The gate wiring lines 16 extend in the X-axis direction across the display region AA. The multiple gate wiring lines 16 are spaced from each other in the Y-axis direction and are arranged in parallel. The scanning signals that are outputted from the gate circuits 15 described above are supplied to the multiple gate wiring lines 16 in order from an upper position in FIG. 2. The source wiring lines 17 extend in the Y-axis direction across the display region AA and intersect with the gate wiring lines 16. The multiple source wiring lines 17 are spaced from each other in the X-axis direction. An image signal that is outputted from the driver 13 described above is supplied to the source wiring lines 17.

As illustrated in FIG. 2, pixel transistors 18 and pixel electrodes 19 are provided near positions at which the gate wiring lines 16 and the source wiring lines 17 intersect with each other. The multiple pixel transistors 18 and the multiple pixel electrodes 19 are regularly arranged in the X-axis direction and the Y-axis direction in a matrix (in a row and in a column) in a plan view. The pixel electrodes 19 are composed of a transparent electrode material. The gate wiring lines 16, the source wiring lines 17, and the pixel electrodes 19 are connected to the pixel transistors 18. The pixel transistors 18 include gate electrodes 18A to which the gate wiring lines 16 are connected, source electrodes 18B to which the source wiring lines 17 are connected, drain electrodes 18C to which the pixel electrodes 19 are connected, and semiconductor portions 18D that are connected to the source electrodes 18B and the drain electrodes 18C. The semiconductor portions 18D are composed of a semiconductor material and are superimposed on the gate electrodes 18A. The pixel transistors 18 are driven based on the scanning signals that are supplied from the gate wiring lines 16 to the gate electrodes 18A and charge the pixel electrodes 19 at the electric potential based on the image signal that is supplied from the source wiring lines 17 to the source electrodes 18B. Color filters that display, for example, R (red), G (green), and B (blue) and light-shielding portions (black matrices) that divide the adjacent color filters, for example, are provided on an inner surface of the facing substrate 11 in the display region AA. The color filters face the pixel electrodes 19 and form respective pixels, each of which is a display unit, together with the pixel electrodes 19 that face the color filters. The facing substrate 11 or the array substrate 12 includes a common electrode that is composed of the same transparent electrode material as that for the pixel electrodes 19 and that is spaced from and superimposed on the pixel electrodes 19. As for the liquid crystal panel 10, a predetermined electric field is applied to the liquid crystal layer, based on a difference in electric potential between the common electrode and each pixel electrode 19, and this enables the pixels to perform predetermined gray scale display.

The gate circuits 15 will now be described in detail with reference to FIG. 3 to FIG. 5. The gate circuits 15 are so-called shift register circuits and include multiple unit circuits 20 illustrated in FIG. 3. The circuit structure of each unit circuit 20 will be described below with reference to FIG. 3. Each unit circuit 20 includes three transistors T1 to T3, a capacitor C1, and five terminals IT1 to IT5. In the following description, a connection wiring line that connects the transistors T1 to T3 and the capacitor C1 to each other is referred to as an inner node nodeA. A set signal Set or a gate start plus signal GSP is inputted into the first terminal (the third electric potential applier) IT1. A reset signal Reset is inputted into the second terminal (the first electric potential applier) IT2. A power voltage signal VSS is inputted into the third terminal (the second electric potential applier) IT3. A clock signal CLK (any one of clock signals CLK1, CLK2, CLK1B, and CLK2B described later) is inputted into the fourth terminal IT4. A scanning signal GL (n) for an n-th position is outputted to the fifth terminal IT5. The symbol "n" described herein is an integer (a natural number) of 1 or more. As for the first transistor T1, a gate electrode and a source electrode are connected to the first terminal IT1, and a drain electrode is connected to the inner node nodeA. As for the second transistor (transistor) T2, a gate electrode is connected to the second terminal IT2, a source electrode is connected to the inner node nodeA (the drain electrode of the first transistor T1), and a drain electrode is connected to the third terminal IT3. As for the third transistor T3, a gate electrode is connected to the inner node nodeA (the drain electrode of the first transistor T1 and the source electrode of the second transistor T2), a source electrode is connected to the fourth terminal IT4, and a drain electrode is connected to the fifth terminal IT5. As for the capacitor C1, an electrode is connected to the inner node nodeA, and another electrode is connected to the fifth terminal IT5.

Relationships between each gate circuit 15 and wiring lines 21 to 29 will be described with reference to FIG. 4. As illustrated in FIG. 4, the gate start plus signal wiring line 21, the multiple (four according to the present embodiment) clock signal wiring lines 22 to 25, the power voltage signal wiring line 26, the set signal wiring lines 27, the reset signal wiring lines 28, and the gate connection wiring lines 29 are connected to the gate circuit 15. The gate start plus signal wiring line 21 is used to supply the gate start plus signal GSP to unit circuits 20 that are included in the gate circuit 15 at a first position and a second position and is connected to the first terminal IT1 that is included in each of the unit circuits 20 at the first position and the second position.

Figure 4:
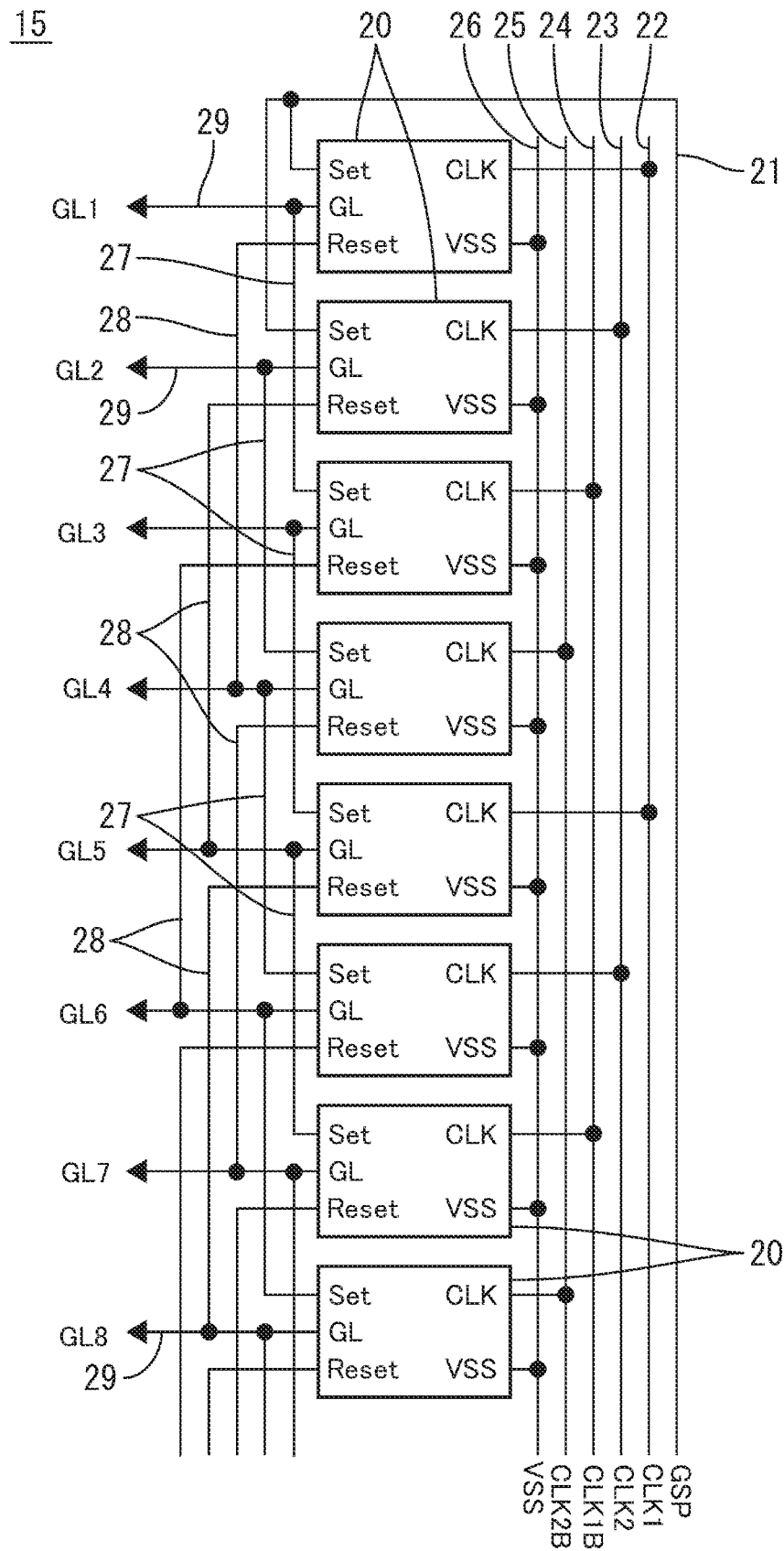
FIG. 4 is a block diagram illustrating relationships among the gate circuit and wiring lines according to the first embodiment.
Figure 5:
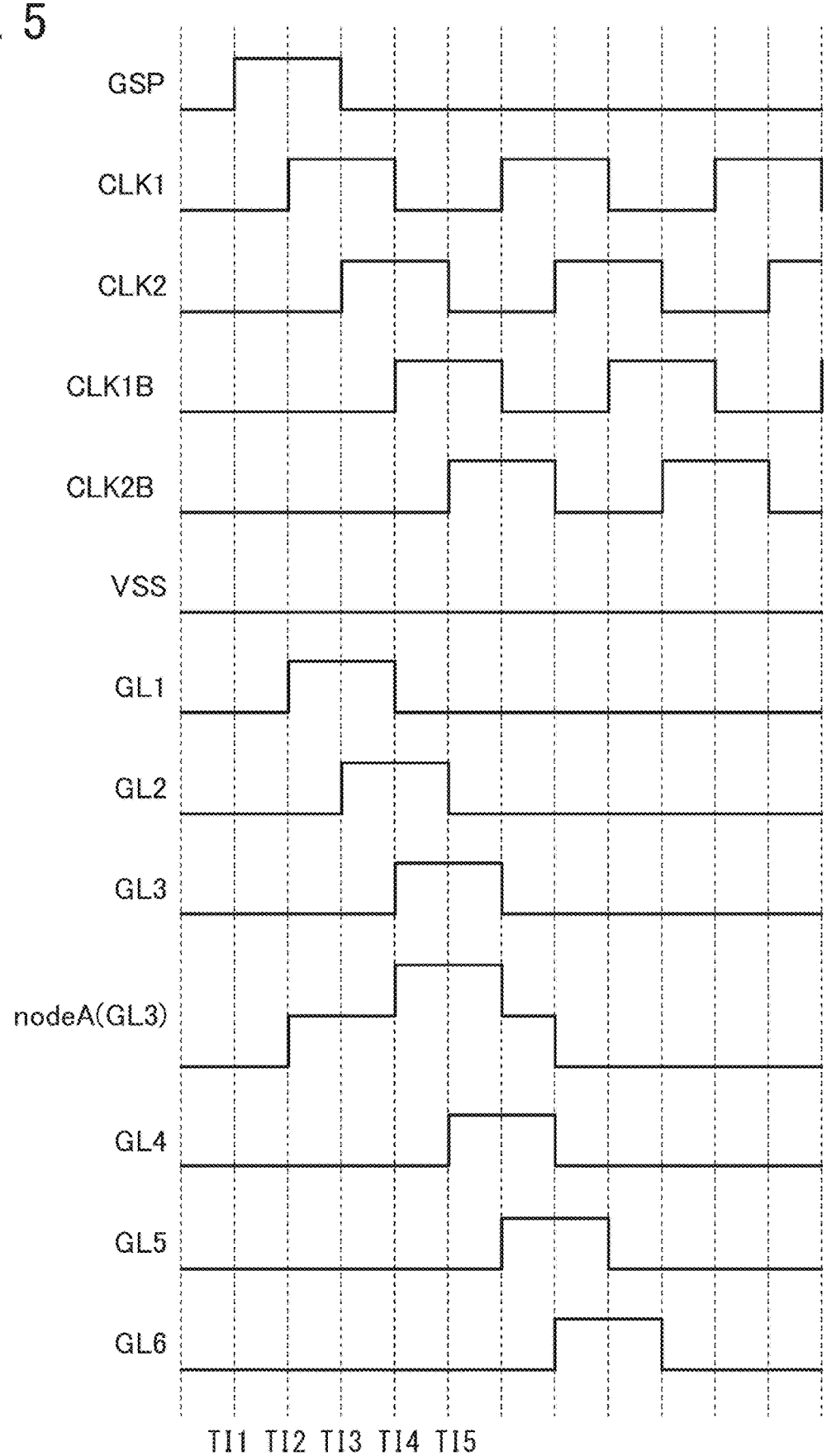
FIG. 5 is a timing chart regarding the operation of the unit circuit according to the first embodiment.

As illustrated in FIG. 4, the four clock signal wiring lines 22 to 25 are selectively connected to the multiple unit circuits 20 that are included in the gate circuit 15 and are used to transmit the four clock signals CLK1, CLK2, CLK1B, and CLK2B with different timings. Specifically, the first clock signal wiring line 22 that is included in the clock signal wiring lines 22 to 25 is connected to the fourth terminal IT4 that is included in the unit circuit 20 at a (4n−3)-th position when the "n" is an integer of 1 or more and is used to supply the clock signal CLK1 to the fourth terminal IT4. The second clock signal wiring line 23 that is included in the clock signal wiring lines 22 to 25 is connected to the fourth terminal IT4 that is included in the unit circuit 20 at a (4n−2)-th position when the "n" is an integer of 1 or more and is used to supply the clock signal CLK2 to the fourth terminal IT4. The third clock signal wiring line 24 that is included in the clock signal wiring lines 22 to 25 is connected to the fourth terminal IT4 that is included in the unit circuit 20 at a (4n−1)-th position when the "n" is an integer of 1 or more and is used to supply the clock signal CLK1B to the fourth terminal IT4. The fourth clock signal wiring line 25 that is included in the clock signal wiring lines 22 to 25 is connected to the fourth terminal IT4 that is included in the unit circuit 20 at a 4n-th position when the "n" is an integer of 1 or more and is used to supply the clock signal CLK2B to the fourth terminal IT4.

As illustrated in FIG. 4, the power voltage signal wiring line 26 is connected to the third terminals IT3 that are included in all of the unit circuits 20 that are included in the gate circuit 15 and is used to supply the power voltage signal VSS that is maintained at a fixed low level of electric potential to the third terminals IT3 over time. The set signal wiring lines 27 are connected to the fifth terminals IT5 that are included in the unit circuits 20 and the first terminals IT1 that are included in unit circuits 20 at subsequent positions and are used to transmit the set signal Set. Specifically, the set signal wiring lines 27 are connected to the first terminal IT1 that is included in the unit circuit 20 at the n-th position when the "n" is an integer of 3 or more and the fifth terminal IT5 that is included in the unit circuit 20 at an (n−2)-th position when the "n" is an integer of 3 or more. The reset signal wiring lines 28 are connected to the fifth terminals IT5 that are included in the unit circuits 20 and the second terminals IT2 that are included in unit circuits 20 at preceding positions and are used to transmit the reset signal Reset. Specifically, the reset signal wiring lines 28 are connected to the fifth terminal IT5 that is included in the unit circuit 20 at the n-th position when the "n" is an integer of 4 or more and the second terminal IT2 that is included in the unit circuit 20 at an (n−3)-th position when the "n" is an integer of 4 or more. The gate connection wiring lines 29 are connected to the fifth terminals IT5 that are included in the unit circuits 20 and the gate wiring lines 16 that are disposed in the display region AA. The gate connection wiring lines 29 enable scanning signals GL that are outputted from the unit circuits 20 to the gate wiring lines 16. Specifically, as for the gate connection wiring lines 29 that are arranged in the non-display region NAA together with the unit circuits 20, the number thereof is equal to the number of the unit circuits 20, first end portions are connected to the gate wiring lines 16, and second end portions are connected to the fifth terminals IT5 that are included in the unit circuits 20.

Figure 3:
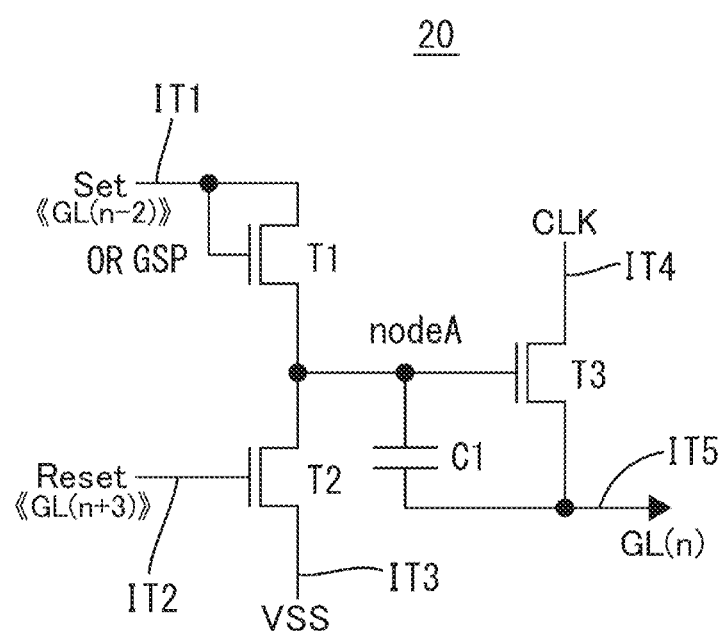
FIG. 3 is a circuit diagram illustrating a circuit structure of a unit circuit that is included in a gate circuit that is included in the array substrate according to the first embodiment.

As illustrated in FIG. 3 and FIG. 4, the multiple unit circuits 20 that are included in each gate circuit 15 output the set signal Set to other unit circuits 20 at subsequent positions and output the reset signal Reset to other unit circuits 20 at the preceding positions when the scanning signals GL (n) are outputted to the gate wiring lines 16 connected. Specifically, the unit circuits 20 at the first position and the second position receive the gate start plus signal GSP from the outside, sequentially receive the clock signals CLK1 and CLK2, and subsequently sequentially supply the scanning signals GL1 and GL2 to the gate wiring lines 16 connected at the first position and the second position. At this time, the unit circuits 20 at the first position and the second position sequentially output the set signal Set to unit circuits 20 at a third position and a fourth position. The unit circuits 20 at the third position and the fourth position sequentially receive the set signal Set from the unit circuits 20 at the first position and the second position, sequentially receive the clock signals CLK1B and CLK2B, and subsequently sequentially supply the scanning signals GL3 and GL4 to the gate wiring lines 16 at the third position and the fourth position. At this time, the unit circuit 20 at the third position outputs the set signal Set to the unit circuit 20 at a fifth position, and the unit circuit 20 at the fourth position outputs the set signal Set to the unit circuit 20 at a sixth position and outputs the reset signal Reset to the unit circuit 20 at the first position. The unit circuits 20 at the fifth position and the sixth position sequentially receive the set signal Set from the unit circuits 20 at the third position and the fourth position, sequentially receive the clock signals CLK1 and CLK2, and subsequently sequentially supply the scanning signals GL5 and GL6 to the gate wiring lines 16 at the fifth position and the sixth position. At this time, the unit circuit 20 at the fifth position outputs the set signal Set to the unit circuit 20 at a seventh position and outputs the reset signal Reset to the unit circuit 20 at the second position. The unit circuit 20 at the sixth position outputs the set signal Set to the unit circuit 20 at an eighth position and outputs the reset signal Reset to the unit circuit 20 at the third position. Regarding the unit circuits 20 at the fourth position and later, generally, the unit circuit 20 at the n-th position when the "n" is an integer of 4 or more supplies the scanning signal GL (n) to the gate wiring line 16 at the n-th position, based on the set signal Set that is inputted from the unit circuit 20 at the (n−2)-th position, subsequently outputs the set signal Set to the unit circuit 20 at an (n+2)-th position, and outputs the reset signal Reset to the unit circuit 20 at the (n−3)-th position. In the above manner, the multiple unit circuits 20 that are included in each gate circuit 15 can sequentially supply the scanning signals GL (n) to the gate wiring lines 16 connected from upper positions.

The operation of the unit circuits 20 will now be described with reference to FIG. 5. FIG. 5 illustrates a timing chart related to the operation of the unit circuits 20. Before the operation of the unit circuits 20 is described, signals and electric potential illustrated in FIG. 5 will be described. FIG. 5 illustrates the gate start plus signal GSP, the clock signals CLK1, CLK2, CLK1B, and CLK2B, the power voltage signal VSS, the first to sixth scanning signals GL1 to GL6, and the electric potential of the inner node nodeA regarding the scanning signal GL3 at the third position in order from above. According to the present embodiment, as illustrated in FIG. 5, the power voltage signal VSS is maintained at a fixed low level of electric potential (third electric potential). The gate start plus signal GSP and the clock signals CLK1, CLK2, CLK1B, and CLK2B are square waves where low levels of electric potential and high levels of electric potential are periodically alternated. The low level of electric potential and the high level of electric potential of the clock signal CLK1 are opposite those of the clock signal CLK1B. Similarly, the low level of electric potential and the high level of electric potential of the clock signal CLK2 are opposite those of the clock signal CLK2B. The high levels of electric potential of the clock signals CLK1, CLK2, CLK1B, and CLK2B are set to values (values equal to or more than a threshold voltage) sufficient to turn on the transistors T1 to T3 and the pixel transistors 18.

The operation of the unit circuits 20 at the first position to the fourth position will be specifically described representatively. As for the unit circuits 20 at the first position and the second position, as illustrated in FIG. 5, the gate start plus signal GSP is supplied to the gate electrodes and the source electrodes of the first transistors T1 at a time TI1. As for the unit circuits 20 at the first position and the second position, the first transistors T1 are then turned on, the high level of electric potential (the third electric potential) of the gate start plus signal GSP that is inputted into the source electrodes is applied to the drain electrodes. Consequently, as for the unit circuits 20 at the first position and the second position, the capacitors C1 are charged, the inner nodes nodeA are maintained at the high level of electric potential, and the third transistors T3 are turned on. Subsequently, the level of electric potential of the clock signal CLK1 is set to the high level at a time TI2. As for the unit circuit 20 at the first position, the high level of electric potential of the clock signal CLK1 is then applied to the drain electrode from the source electrode of the third transistor T3 that is turned on, and accordingly, the electric potential of the fifth terminal IT5 increases. At this time, as for the unit circuit 20 at the first position, the increase in the electric potential of the fifth terminal IT5 increases the electric potential of the inner node nodeA because the capacitor C1 is provided between the inner node nodeA and the fifth terminal IT5. That is, the electric potential of the inner node nodeA is pushed up (bootstrapped). Consequently, as for the unit circuit 20 at the first position, the electric potential of the gate electrode of the third transistor T3 increases, and accordingly, the electric potential of the fifth terminal IT5 reaches the high level of electric potential of the clock signal CLK1. Consequently, a high level of the scanning signal GL1 is supplied to the gate wiring line 16 at the first position. At this time, the scanning signal GL1 that is outputted to the fifth terminal IT5 that is included in the unit circuit 20 at the first position is supplied as the set signal Set to the first terminal IT1 that is included in the unit circuit 20 at the third position. The electric potential of the set signal Set is the high level of electric potential (the third electric potential). As for the unit circuit 20 at the third position, the set signal Set is then supplied to the gate electrode and the source electrode of the first transistor T1. Consequently, the capacitor C1 is charged, the inner node nodeA is maintained at the high level of electric potential, and the third transistor T3 is turned on.

Subsequently, the level of electric potential of the clock signal CLK2 is set to the high level at a time TI3. As for the unit circuit 20 at the second position, the high level of electric potential of the clock signal CLK2 is then applied from the source electrode of the third transistor T3 that is turned on to the drain electrode, and accordingly, the electric potential of the fifth terminal IT5 increases. At this time, as for the unit circuit 20 at the second position, the electric potential of the inner node nodeA is pushed up, and accordingly, the electric potential of the fifth terminal IT5 reaches the high level of electric potential of the clock signal CLK2. Consequently, the high level of the scanning signal GL2 is supplied to the gate wiring line 16 at the second position. At this time, the scanning signal GL2 that is outputted to the fifth terminal IT5 that is included in the unit circuit 20 at the second position is supplied as the set signal Set to the first terminal IT1 that is included in the unit circuit 20 at the fourth position.

Subsequently, the level of electric potential of the clock signal CLK1B is set to the high level at a time TI4. As for the unit circuit 20 at the third position, the high level of electric potential of the clock signal CLK1B is then applied from the source electrode of the third transistor T3 that is turned on to the drain electrode, and accordingly, the electric potential of the fifth terminal IT5 increases. At this time, as for the unit circuit 20 at the third position, the electric potential of the inner node nodeA is pushed up, and accordingly, the electric potential of the fifth terminal IT5 reaches the high level of electric potential of the clock signal CLK1B. Consequently, the high level of the scanning signal GL3 is supplied to the gate wiring line 16 at the third position. At this time, the scanning signal GL3 that is outputted to the fifth terminal IT5 that is included in the unit circuit 20 at the third position is supplied as the set signal Set to the first terminal IT1 that is included in the unit circuit 20 at the fifth position. The level of electric potential of the clock signal CLK1 is set to the low level at the time TI4. As for the unit circuit 20 at the first position, the electric potential of the inner node nodeA is then pushed down, and accordingly, the level of electric potential of the fifth terminal IT5 is set to the low level.

Subsequently, the level of electric potential of the clock signal CLK2B is set to the high level at a time TI5. As for the unit circuit 20 at the fourth position, the high level of electric potential of the clock signal CLK2B is then applied from the source electrode of the third transistor T3 that is turned on to the drain electrode, and accordingly, the electric potential of the fifth terminal IT5 increases. At this time, as for the unit circuit 20 at the fourth position, the electric potential of the inner node nodeA is pushed up, and accordingly, the electric potential of the fifth terminal IT5 reaches the high level of electric potential of the clock signal CLK2B. Consequently, the high level of the scanning signal GL4 is supplied to the gate wiring line 16 at the fourth position. At this time, the scanning signal GL4 that is outputted to the fifth terminal IT5 that is included in the unit circuit 20 at the fourth position (the n-th position) is supplied as the set signal Set to the first terminal IT1 that is included in the unit circuit 20 at the sixth position (the (n+2)-th position) and is supplied as the reset signal Reset to the second terminal IT2 that is included in the unit circuit 20 at the first position (the (n−3)-th position). The reset signal Reset is the high level of electric potential (first electric potential). As for the unit circuit 20 at the first position, the source electrode and the drain electrode of the second transistor T2 are then energized, and consequently, the level of electric potential of the inner node nodeA is set to the low level of electric potential (second electric potential) of the power voltage signal VSS. Consequently, the third transistor T3 that is included in the unit circuit 20 at the first position is turned off, and the level of electric potential of the fifth terminal IT5 and the inner node nodeA is set to the low level. At the time TI5, the electric potential of the clock signal CLK2 is set to the low level. As for the unit circuit 20 at the second position, the electric potential of the inner node nodeA is then pushed down, and accordingly, the level of electric potential of the fifth terminal IT5 is set to the low level. In the above manner, the multiple unit circuits 20 sequentially output the scanning signals GL from the upper positions.

As for the second transistor T2 that is included in each unit circuit 20 that operates in the above manner, as illustrated in FIG. 3, the power voltage signal VSS that is maintained at the fixed low level of electric potential is supplied to the drain electrode. For this reason, the direction in which electrons move between the source electrode and the drain electrode as the second transistor T2 is driven is fixed to a direction from the drain electrode toward the source electrode. The direction in which the electrons move is thus fixed, and accordingly, a hot carrier is likely to occur in some cases where there is a difference in electric potential between the drain electrode and the source electrode. The occurrence of the hot carrier poses a risk of a problem such as variations in electrical characteristics of the second transistor T2. In particular, if the size of the liquid crystal panel 10 is increased, or frequencies of signals related to the drive of the liquid crystal panel 10 are increased, the high levels of the signals related to the drive tend to be further increased. Also according to the present embodiment, if the high levels of the gate start plus signal GSP and the set signal Set are further increased, the difference in electric potential between the source electrode and the drain electrode that are included in the second transistor T2 increases. For this reason, there is a concern that the hot carrier described above is more likely to occur.

Figure 6:
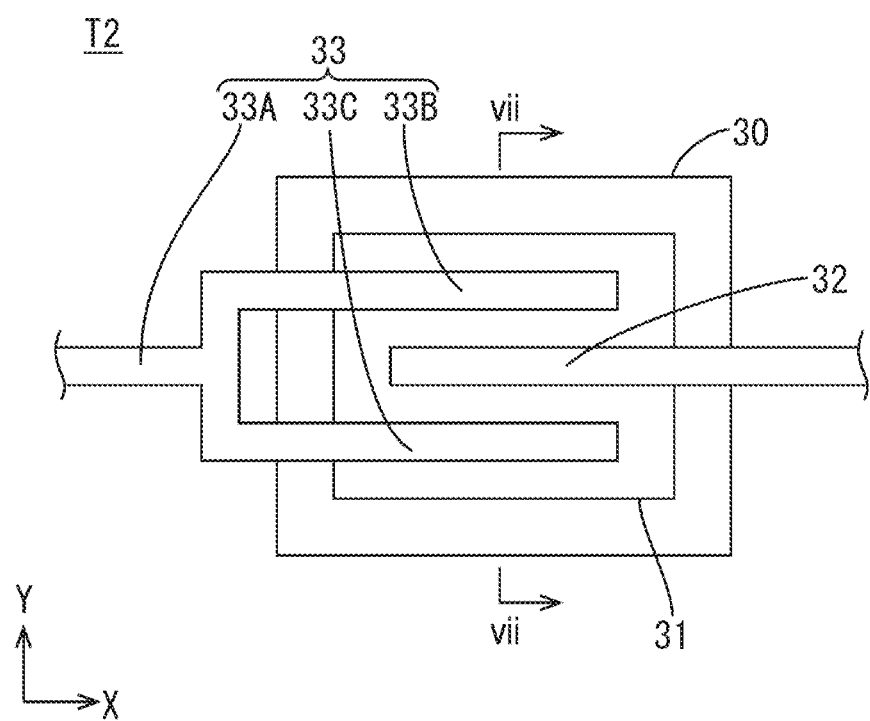
FIG. 6 is a plan view of a second transistor that is included in the unit circuit according to the first embodiment.
Figure 7:
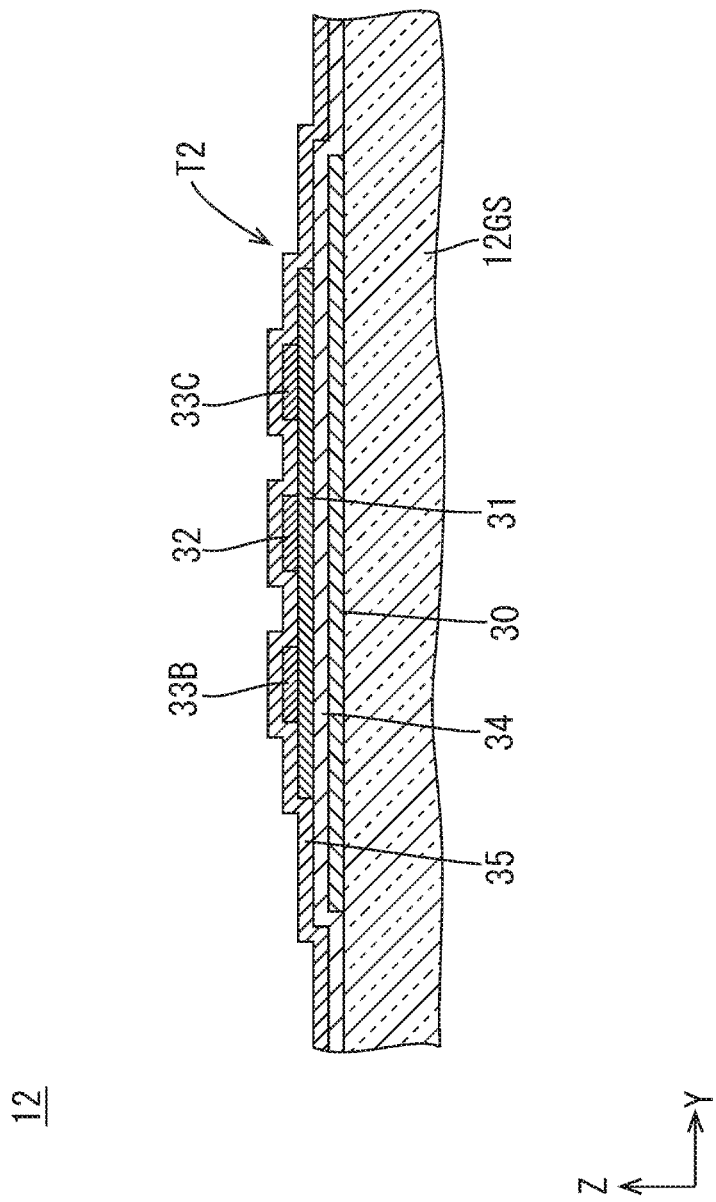
FIG. 7 is a sectional view of the array substrate according to the first embodiment taken along line vii-vii in FIG. 6.

According to the present embodiment, the second transistor T2 has the structure described below in consideration for the problem described above. The structure of the second transistor T2 will be described in detail with reference to FIG. 6 and FIG. 7. FIG. 6 illustrates the structure of the second transistor T2 in a plan view. FIG. 7 illustrates the structure of the second transistor T2 in a sectional view. As illustrated in FIG. 6, the second transistor T2 includes a first electrode 30 that is the gate electrode, a first semiconductor portion 31 composed of a semiconductor material, a second electrode 32 that is the drain electrode, and a third electrode 33 that is the source electrode. A planar shape of the first electrode 30 is a rectangular shape. The first electrode 30 is connected to the second terminal IT2 (see FIG. 3). A planar shape of the first semiconductor portion 31 is a rectangular shape, and the size thereof is smaller than that of the first electrode 30 in a plan view. The first semiconductor portion 31 is entirely superimposed on a portion (a central portion) of the first electrode 30 in a plan view. The second electrode 32 has a belt-like shape that has a predetermined width and that extends in the X-axis direction illustrated in FIG. 6 in a plan view. A portion of the second electrode 32 is superimposed on the first electrode 30 and the first semiconductor portion 31, and the other portion extends in the right-hand direction in FIG. 6 and is connected to the third terminal IT3 (see FIG. 3). The third electrode 33 has a two-way branch structure in a plan view. Portions of the third electrode 33 are superimposed on the first electrode 30 and the first semiconductor portion 31, and the other portion extends in the left-hand direction in FIG. 6 and is connected to the inner node nodeA (the drain electrode of the first transistor T1) (see FIG. 3). The structure of the third electrode 33 will be described in detail later.

As illustrated in FIG. 7, at least a first metal film (a first conductive film) that is included in the first electrode 30, a gate insulating film (a first insulating film) 34, a semiconductor film that is included in the first semiconductor portion 31, a second metal film (a second conductive film) that is included in the second electrode 32 and the third electrode 33, and a first interlayer insulating layer (a second insulating film) 35 are stacked in order from a lower layer on a glass substrate (a substrate) 12GS of the array substrate 12. The first metal film and the second metal film are a single-layer film composed of a kind of metal material selected from, for example, copper, titanium, aluminum, molybdenum, and tungsten or a multilayer film or an alloy composed of different kinds of metal materials and consequently have electrical conductivity and a light shielding property. The semiconductor film is composed of an oxide semiconductor or a semiconductor material such as amorphous silicon. The gate insulating film 34 and the first interlayer insulating layer 35 are composed of an inorganic material such as silicon oxynitride ($SiN_x$) or silicon oxide ($SiO_2$).

As illustrated in FIG. 7, the first electrode 30 composed of the first metal film is located at a lower layer of the first semiconductor portion 31 composed of the semiconductor film with the gate insulating film 34 interposed therebetween. That is, the second transistor T2 according to the present embodiment is a bottom gate transistor. The second electrode 32 and the third electrode 33 composed of the second metal film are covered by the first interlayer insulating layer 35. A voltage (the reset signal Reset) equal to or more than the threshold voltage of the second transistor T2 is applied to the first electrode 30, and a channel region in which electrons can move is consequently created in the first semiconductor portion 31. The second electrode 32 and the third electrode 33 composed of the second metal film are directly stacked on the first semiconductor portion 31 composed of the semiconductor film and are connected to respective parts of the first semiconductor portion 31. Accordingly, the channel region is created in the first semiconductor portion 31 as the second transistor T2 is driven, and the electrons consequently move from the second electrode 32 to the third electrode 33 via the channel region.

As illustrated in FIG. 6, the third electrode 33 that is included in the second transistor T2 according to the present embodiment includes a base portion 33A, and a first portion 33B and a second portion 33C that branch from the base portion 33A. The base portion 33A is superimposed on neither the first electrode 30 nor the first semiconductor portion 31. The first portion 33B and the second portion 33C are superimposed on the first electrode 30 and the first semiconductor portion 31 and extend in a direction in which the second electrode 32 extends (the X-axis direction). The first portion 33B is spaced from the second electrode 32 in the Y-axis direction. The first portion 33B extends in parallel with the second electrode 32, and accordingly, a distance between the first portion 33B and the second electrode 32 is substantially fixed. The second portion 33C is spaced from the second electrode 32 in the Y-axis direction opposite (downward in FIG. 6) the first portion 33B (upward in FIG. 6). The second portion 33C extends in parallel with the second electrode 32, and accordingly, a distance between the second portion 33C and the second electrode 32 is substantially fixed. The distance between the second portion 33C and the second electrode 32 is substantially equal to the distance between the first portion 33B and the second electrode 32.

With this structure, when the high level of electric potential (the first electric potential) is applied to the first electrode 30, and the second transistor T2 is driven, the level of electric potential of the third electrode 33 is set to the high level (the third electric potential), and the level of electric potential of the second electrode 32 is set to the low level (the second electric potential). Accordingly, the electrons move from the second electrode 32 that has electric potential lower than that of the third electrode 33 to the third electrode 33 via the channel region of the first semiconductor portion 31. As illustrated in FIG. 6 and FIG. 7, the third electrode 33 includes the first portion 33B and the second portion 33C that sandwich the second electrode 32 therebetween at positions spaced from the second electrode 32, and accordingly, paths along which the electrons move are divided into a path that extends from the second electrode 32 to the first portion 33B of the third electrode 33 and a path that extends from the second electrode 32 to the second portion 33C of the third electrode 33. Consequently, the electrons are inhibited from concentrating. Accordingly, even in the case where a difference in electric potential between the second electrode 32 and the third electrode 33 is large, and the intensity of the electric field is high as in the present embodiment, the hot carrier is inhibited from occurring, and the hot carrier is unlikely to enter the gate insulating film 34 and the first electrode 30. Since the hot carrier is unlikely to enter, the electrical characteristics of the second transistor are unlikely to vary, and the gate circuits 15 are unlikely to malfunction. The second electrode 32 and the third electrode 33 do not have a multilayer structure that causes a step unlike the existing cases, and accordingly, a good yield is ensured.

The second transistor (the transistor) T2 according to the present embodiment includes the first electrode 30, the first semiconductor portion 31 that is at least partly superimposed on the first electrode 30 and that is composed of the semiconductor material, the gate insulating film (the first insulating film) 34 that is interposed between the first electrode 30 and the first semiconductor portion 31, the second electrode 32 that is superimposed on a part of the first semiconductor portion 31 and that is connected to the first semiconductor portion 31, and the third electrode 33 that is located in the layer in which the second electrode 32 is located, that is superimposed on parts of the first semiconductor portion 31, and that is connected to the first semiconductor portion 31. The electric potential of the second electrode 32 is lower than that of the third electrode 33. The third electrode 33 includes the first portion 33B is spaced from the second electrode 32 and the second portion 33C that is spaced from the second electrode 32 opposite the first portion 33B as described above.

The voltage equal to or more than the threshold voltage of the second transistor T2 is applied to the first electrode 30, and the channel region is consequently created in the first semiconductor portion 31. Along with this, the electrons move from the second electrode 32 that has the electric potential lower than that of the third electrode 33 to the third electrode 33 via the channel region. The third electrode 33 includes the first portion 33B and the second portion 33C that sandwich the second electrode 32 therebetween at the positions spaced from the second electrode 32, and accordingly, the paths along which the electrons move are divided into the path that extends from the second electrode 32 to the first portion 33B of the third electrode 33 and the path that extends from the second electrode 32 to the second portion 33C of the third electrode 33. Consequently, the electrons are inhibited from concentrating. Accordingly, even in the case where the intensity of the electric field is high, such as the case where the difference in electric potential between the second electrode 32 and the third electrode 33 is large, the hot carrier is inhibited from occurring, and the hot carrier is unlikely to enter the gate insulating film 34 and the first electrode 30. The second electrode 32 and the third electrode 33 do not have a multilayer structure that causes a step unlike the existing cases, and accordingly, a good yield is ensured.

The first electrode 30 is located at a lower layer of the gate insulating film 34, the first semiconductor portion 31 is located at an upper layer of the gate insulating film 34, and the second electrode 32 and the third electrode 33 are located at an upper layer of the first semiconductor portion 31. The voltage is applied to the first electrode 30 that is located at the lower layer of the gate insulating film 34, and the channel region is consequently created in the first semiconductor portion 31 that is located at the upper layer of the gate insulating film 34. Along with this, the electrons move between the second electrode 32 and the third electrode 33 that are located at the upper layer of the first semiconductor portion 31.

The array substrate (the circuit substrate) 12 according to the present embodiment includes the second transistor T2 and the glass substrate (the substrate) 12GS on which the second transistor T2 is provided. The array substrate 12 ensures a good yield and inhibits the hot carrier from occurring and accordingly obtains high reliability.

The second terminal (the first electric potential applier) IT2 that applies the first electric potential equal to or more than the threshold voltage of the second transistor T2 to the first electrode 30, the third terminal (the second electric potential applier) IT3 that applies the second electric potential lower than the first electric potential to the second electrode 32, and the first terminal (the third electric potential applier) IT1 that applies the third electric potential higher than the second electric potential to the third electrode 33 are included. The second terminal IT2 applies the first electric potential equal to or more than the threshold voltage of the second transistor T2 to the first electrode 30, and the channel region is consequently created in the first semiconductor portion 31. The third terminal IT3 applies the second electric potential lower than the first electric potential to the second electrode 32, and the first terminal IT1 applies the third electric potential higher than the second electric potential to the third electrode 33. Accordingly, the channel region is created, and the electrons consequently move from the second electrode 32 to the third electrode 33. The third electrode 33 includes the first portion 33B and the second portion 33C that sandwich the second electrode 32 therebetween, and accordingly, the paths along which the electrons move can be divided. This enables the hot carrier to be inhibited from occurring.

The liquid crystal panel (the display device) 10 according to the present embodiment includes the array substrate 12 and the facing substrate 11 that faces the array substrate 12 described above. Since the array substrate 12 obtains high reliability, the liquid crystal panel 10 obtains high reliability regarding the liquid crystal panel 10.

Second Embodiment

A second embodiment will be described with reference to FIG. 8 or FIG. 9. In a case described according to the second embodiment, structures of a second electrode 132 and a third electrode 133 are changed. The duplicated description of structures, actions, and effects like to those according to the first embodiment described above is omitted.

Figure 8:
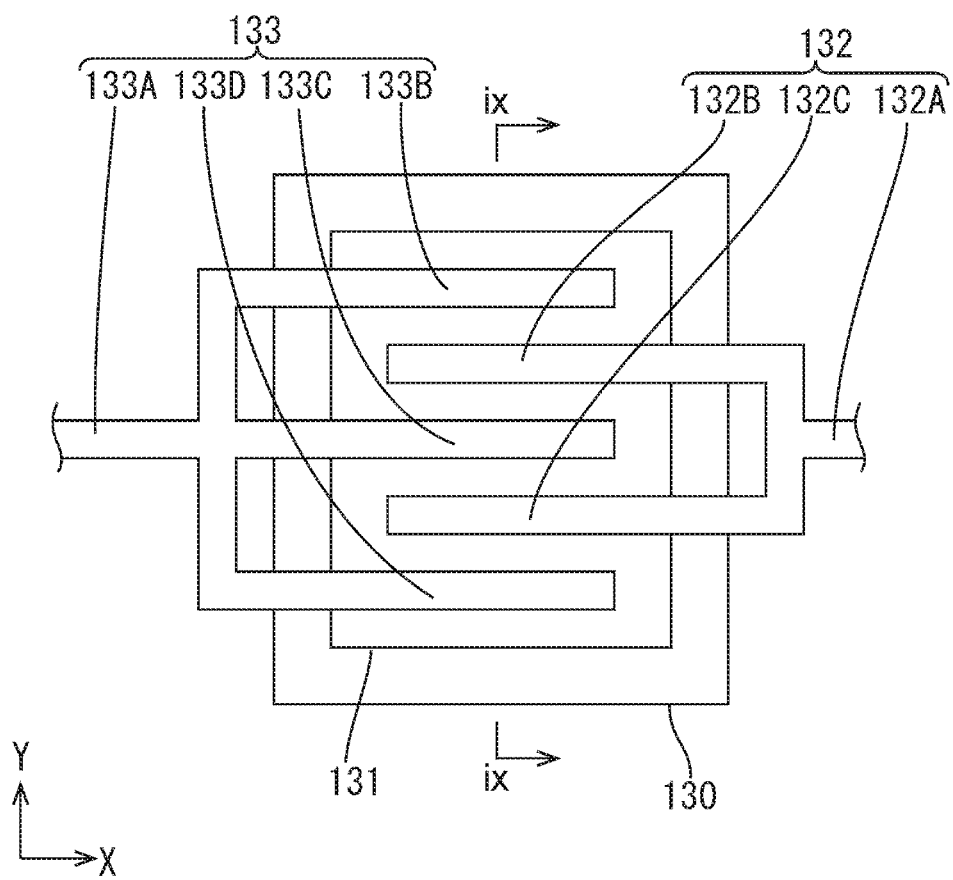
FIG. 8 is a plan view of a second transistor that is included in a unit circuit according to a second embodiment.
Figure 9:
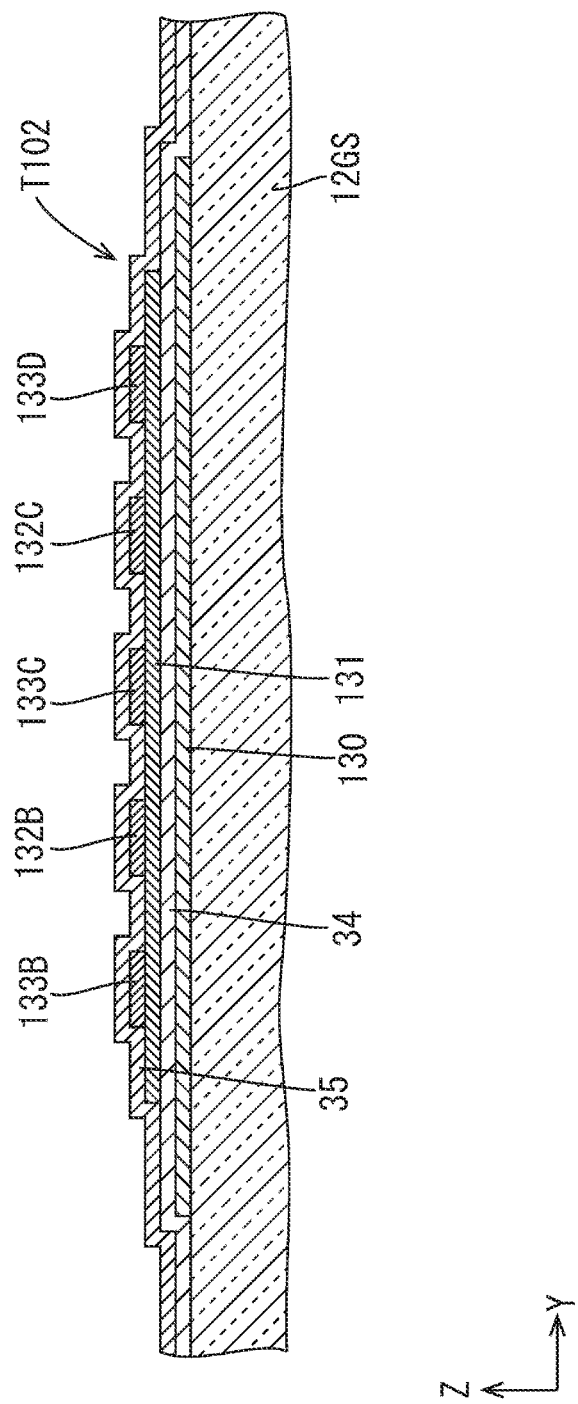
FIG. 9 is a sectional view of an array substrate according to the second embodiment taken along line ix-ix in FIG. 8.

As illustrated in FIG. 8 and FIG. 9, the third electrode 133 that is included in a second transistor T102 according to the present embodiment has a three-way branch structure in a plan view. The third electrode 133 includes a base portion 133A, a first portion 133B, a second portion 133C, and a third portion 133D. The third portion 133D is superimposed on a first electrode 130 and a first semiconductor portion 131 and extend in a direction (the X-axis direction) in which the first portion 133B and the second portion 133C extend. The third portion 133D is spaced from the second portion 133C in the Y-axis direction opposite (downward in FIG. 8) the first portion 133B (upward in FIG. 8). The third portion 133D extends in parallel with the first portion 133B and the second portion 133C, and accordingly, distances between the third portion 133D and the first portion 133B are substantially fixed.

As illustrated in FIG. 8 and FIG. 9, the second electrode 132 has a two-way branch structure in a plan view. Specifically, the second electrode 132 includes a base portion 132A, and a fourth portion 132B and a fifth portion 132C that branch from the base portion 132A. The base portion 132A is superimposed on neither the first electrode 130 nor the first semiconductor portion 131. The fourth portion 132B and the fifth portion 132C are superimposed on the first electrode 130 and the first semiconductor portion 131 and extend in a direction (the X-axis direction) in which the first portion 133B, the second portion 133C, and the third portion 133D extend. The fourth portion 132B is sandwiched between the first portion 133B and the second portion 133C and is spaced from the first portion 133B and the second portion 133C in the Y-axis direction. The fourth portion 132B extends in parallel with the first portion 133B and the second portion 133C, and accordingly, a distance between the fourth portion 132B and the first portion 133B and a distance between the fourth portion 132B and the second portion 133C are substantially fixed. The distance between the fourth portion 132B and the first portion 133B is substantially equal to the distance between the fourth portion 132B and the second portion 133C. The fifth portion 132C is sandwiched between the second portion 133C and the third portion 133D and is spaced from the second portion 133C and the third portion 133D in the Y-axis direction. The fifth portion 132C extends in parallel with the second portion 133C and the third portion 133D, and accordingly, a distance between the fifth portion 132C and the second portion 133C and a distance between the fifth portion 132C and the third portion 133D are substantially fixed. The distance between the fifth portion 132C and the second portion 133C is substantially equal to the distance between the fifth portion 132C and the third portion 133D.

With this structure, the paths along which the electrons move from the second electrode 132 to the third electrode 133 via the channel region that is created in the first semiconductor portion 131 as the second transistor T102 is driven are as follows. That is, the paths along which the electrons move are divided into a path that extends from the fourth portion 132B of the second electrode 132 to the first portion 133B of the third electrode 133, a path that extends from the fourth portion 132B of the second electrode 132 to the second portion 133C of the third electrode 133, a path that extends from the fifth portion 132C of the second electrode 132 to the second portion 133C of the third electrode 133, and a path that extends from the fifth portion 132C of the second electrode 132 to the third portion 133D of the third electrode 133. According to the present embodiment, the number of the paths along which the electrons move is larger than that according to the first embodiment described above, and accordingly, the hot carrier is more unlikely to occur.

According to the present embodiment, the third electrode 133 includes the third portion 133D that is spaced from the second portion 133C opposite the first portion 133B, and the second electrode 132 includes the fourth portion 132B that is sandwiched between the first portion 133B and the second portion 133C and that is spaced from the first portion 133B and the second portion 133C and the fifth portion 132C that is sandwiched between the second portion 133C and the third portion 133D and that is spaced from the second portion 133C and the third portion 133D as described above. Consequently, the paths along which the electrons move are divided into the path that extends from the fourth portion 132B of the second electrode 132 to the first portion 133B of the third electrode 133, the path that extends from the fourth portion 132B of the second electrode 132 to the second portion 133C of the third electrode 133, the path that extends from the fifth portion 132C of the second electrode 132 to the second portion 133C of the third electrode 133, and the path that extends from the fifth portion 132C of the second electrode 132 to the third portion 133D of the third electrode 133. This makes the hot carrier more unlikely to occur.

Third Embodiment

A third embodiment will be described with reference to FIG. 10 or FIG. 11. In a case described according to the third embodiment, the structure of a second transistor T202 is changed from the structure according to the first embodiment described above. The duplicated description of structures, actions, and effects like to those according to the first embodiment described above is omitted.

Figure 10:
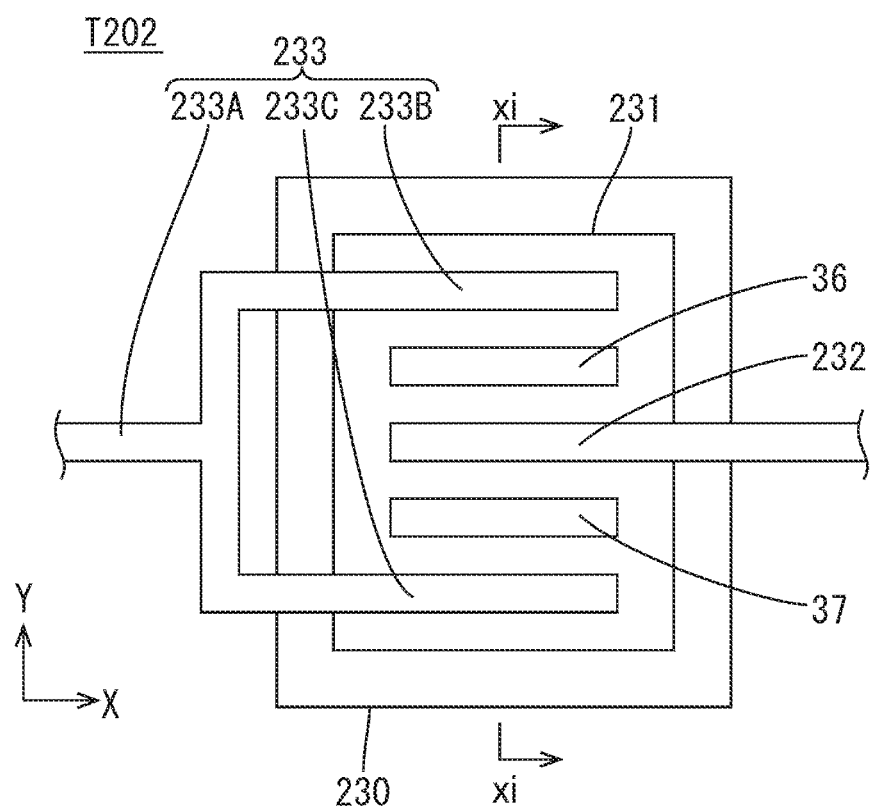
FIG. 10 is a plan view of a second transistor that is included in a unit circuit according to a third embodiment.

As illustrated in FIG. 10, the second transistor T202 according to the present embodiment includes a fourth electrode 36 and a fifth electrode 37. The fourth electrode 36 and the fifth electrode 37 have a belt-like shape that has a predetermined width and that extends in the X-axis direction in a plan view. The fourth electrode 36 and the fifth electrode 37 are entirely superimposed on a first electrode 230 and a first semiconductor portion 231. The fourth electrode 36 is adjacent to a first portion 233B of a third electrode 233 in the Y-axis direction opposite a second electrode 232. The fourth electrode 36 is sandwiched between the second electrode 232 and the first portion 233B of the third electrode 233 and is spaced from the second electrode 232 and the first portion 233B of the third electrode 233. The fourth electrode 36 extends in parallel with the second electrode 232 and the first portion 233B, and accordingly, a distance between the fourth electrode 36 and the second electrode 232 and a distance between the fourth electrode 36 and the first portion 233B are substantially fixed. The distance between the fourth electrode 36 and the second electrode 232 is substantially equal to the distance between the fourth electrode 36 and the first portion 233B. The fifth electrode 37 is adjacent to a second portion 233C of the third electrode 233 in the Y-axis direction opposite the second electrode 232. The fifth electrode 37 is sandwiched between the second electrode 232 and the second portion 233C of the third electrode 233 and is spaced from the second electrode 232 and the second portion 233C of the third electrode 233. The fifth electrode 37 extends in parallel with the second electrode 232 and the second portion 233C, and accordingly, a distance between the fifth electrode 37 and the second electrode 232 and a distance between the fifth electrode 37 and the second portion 233C are substantially fixed. The distance between the fifth electrode 37 and the second electrode 232 is substantially equal to the distance between the fifth electrode 37 and the second portion 233C. The distance between the fifth electrode 37 and the second electrode 232 is substantially equal to the distance between the fifth electrode 37 and the second portion 233C.

Figure 11:
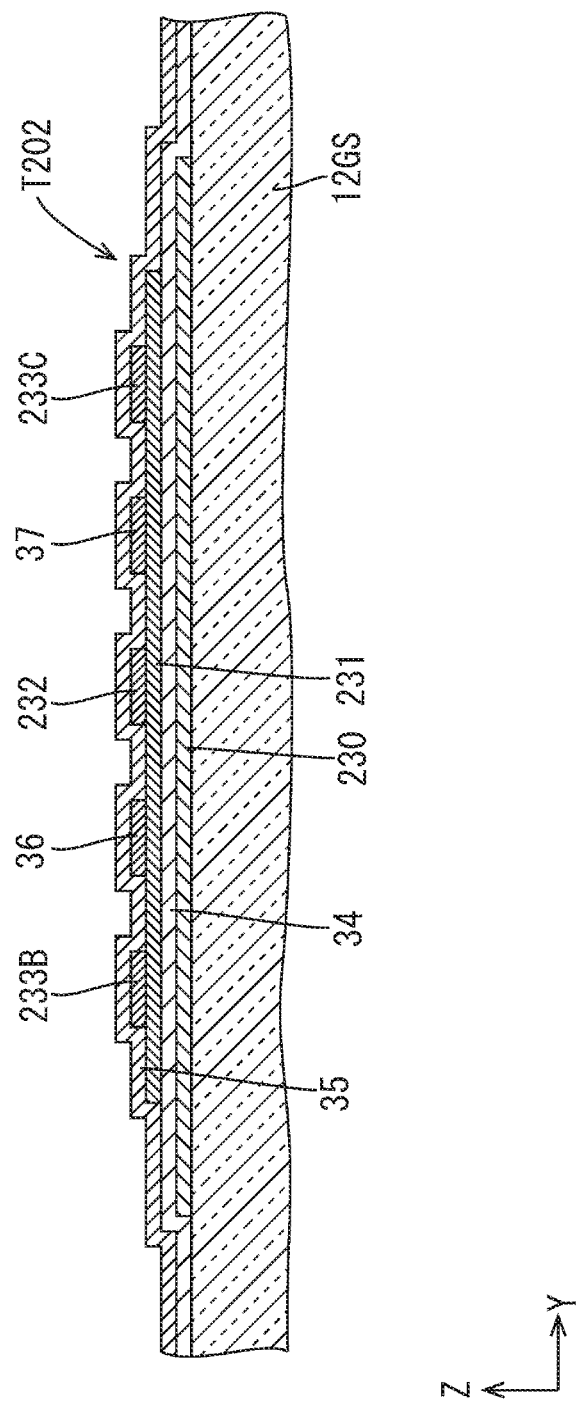
FIG. 11 is a sectional view of an array substrate according to the third embodiment taken along line xi-xi in FIG. 10.

As illustrated in FIG. 11, the fourth electrode 36 and the fifth electrode 37 are composed of portions of the second metal film that differ from the second electrode 232 and the third electrode 233. That is, the fourth electrode 36 and the fifth electrode 37 are located in a layer in which the second electrode 232 and the third electrode 233 are located. The fourth electrode 36 and the fifth electrode 37 are directly stacked on the first semiconductor portion 231 composed of the semiconductor film and are connected to respective parts of the first semiconductor portion 231. As illustrated in FIG. 10 and FIG. 11, the fourth electrode 36 and the fifth electrode 37 that have such structures are not connected to, for example, electrodes, terminals, and wiring lines other than the first semiconductor portion 231. That is, each of the fourth electrode 36 and the fifth electrode 37 can be referred to as a floating node that is electrically isolated. Accordingly, the electric potential of the fourth electrode 36 and the fifth electrode 37 is higher than the low level of electric potential of the second electrode 232 and is lower than the high level of electric potential of the third electrode 233 when the second transistor T202 is driven. That is, the electric potential of the fourth electrode 36 and the fifth electrode 37 is between the electric potential of the second electrode 232 and the electric potential of the third electrode 233.

With this structure, the paths along which the electrons move from the second electrode 232 to the third electrode 233 via the channel region that is created in the first semiconductor portion 231 as the second transistor T202 is driven are as follows. That is, the paths along which the electrons move are divided into a path that extends from the second electrode 232 to the first portion 233B of the third electrode 233 via the fourth electrode 36 and a path that extends from the second electrode 232 to the second portion 233C of the third electrode 233 via the fifth electrode 37. According to the present embodiment, the fourth electrode 36 and the fifth electrode 37 are added into the paths along which the electrons move, and accordingly, the hot carrier is more unlikely to occur.

According to the present embodiment, the fourth electrode 36 and the fifth electrode 37 are located in the layer in which the second electrode 232 and the third electrode 233 are located, are superimposed on parts of the first semiconductor portion 231, and are connected to the first semiconductor portion 231, the fourth electrode 36 is sandwiched between the second electrode 232 and the first portion 233B and is spaced from the second electrode 232 and the first portion 233B, the fifth electrode 37 is sandwiched between the second electrode 232 and the second portion 233C and is spaced from the second electrode 232 and the second portion 233C, and the electric potential of the fourth electrode 36 and the fifth electrode 37 is higher than that of the second electrode 232 and is lower than that of the third electrode 233 as described above. The channel region is created in the first semiconductor portion 231, the electrons consequently move from the second electrode 232 to the first portion 233B of the third electrode 233 via the fourth electrode 36 and move from the second electrode 232 to the second portion 233C of the third electrode 233 via the fifth electrode 37. The fourth electrode 36 and the fifth electrode 37 are added into the paths along which the electrons move, and accordingly, the hot carrier is more unlikely to occur.

Fourth Embodiment

A fourth embodiment will be described with reference to FIG. 12. In a case described according to the fourth embodiment, the structure of a second transistor T302 is changed from the structure according to the first embodiment described above. The duplicated description of structures, actions, and effects like to those according to the first embodiment described above is omitted.

Figure 12:
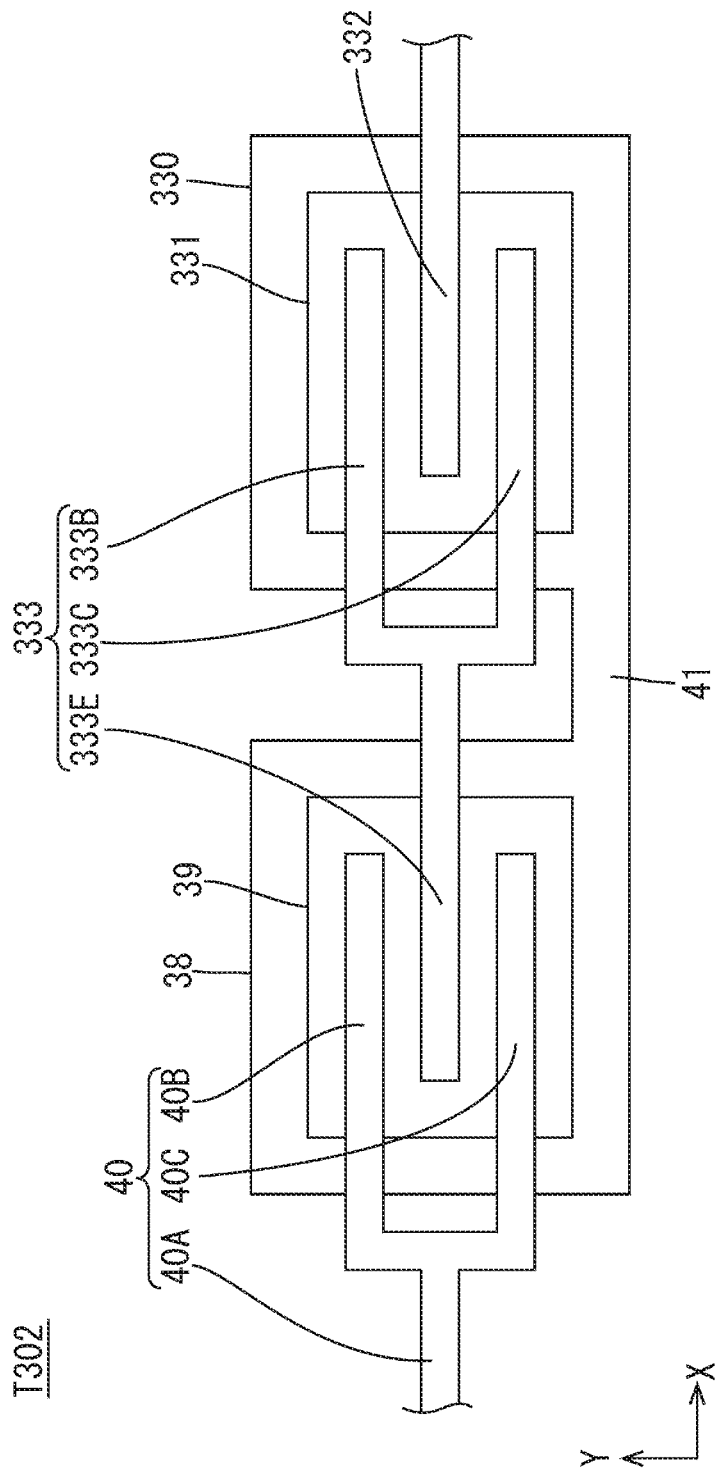
FIG. 12 is a plan view of a second transistor that is included in a unit circuit according to a fourth embodiment.

As illustrated in FIG. 12, the second transistor T302 according to the present embodiment includes a sixth electrode 38, a second semiconductor portion 39, and a seventh electrode 40. A planar shape of the sixth electrode 38 is a rectangular shape and is spaced from a first electrode 330 in the left-hand direction in FIG. 12 in the X-axis direction. The sixth electrode 38 is composed of the first metal film and is connected to the first electrode 330 by using a joint 41 composed of the first metal film. Accordingly, the electric potential of the sixth electrode 38 is equal to that of the first electrode 330. The second semiconductor portion 39 is spaced from a first semiconductor portion 331 in the left-hand direction (toward to the seventh electrode 40) in FIG. 12 in the X-axis direction and is superimposed on the sixth electrode 38 in a plan view. A planar shape of the second semiconductor portion 39 is a rectangular shape, and the size thereof is smaller than that of the sixth electrode 38 in a plan view. The second semiconductor portion 39 is composed of the semiconductor film and is entirely superimposed on a portion (a central portion) of the sixth electrode 38 in a plan view. A third electrode 333 includes a first portion 333B and a sixth portion 333E that is continuous to a second portion 333C. The sixth portion 333E extends in the X-axis direction from end portions of the first portion 333B and the second portion 333C opposite the first semiconductor portion 331 in the left-hand direction (toward the second semiconductor portion 39) illustrated in FIG. 12, and an extending end portion thereof is superimposed on a part of the second semiconductor portion 39. The sixth portion 333E is connected to the second semiconductor portion 39.

The seventh electrode 40 has a two-way branch structure in a plan view. Portions of the seventh electrode 40 are superimposed on the sixth electrode 38 and the second semiconductor portion 39, and the other portion extends in the left-hand direction in FIG. 12 and is connected to the inner node nodeA (see FIG. 3). Accordingly, when the second transistor T302 is driven, the level of electric potential of the seventh electrode 40 is set to the high level as in the inner node nodeA. Specifically, the seventh electrode 40 includes a base portion 40A, and a seventh portion 40B and an eighth portion 40C that branch from the base portion 40A. The base portion 40A is superimposed on neither the sixth electrode 38 nor the second semiconductor portion 39. The seventh portion 40B and the eighth portion 40C are superimposed on the sixth electrode 38 and the second semiconductor portion 39 and extend in a direction (the X-axis direction) in which the sixth portion 333E of the third electrode 333 extends. The seventh electrode 40 is composed of the same second metal film as a second electrode 332 and the third electrode 333. Accordingly, the seventh portion 40B and the eighth portion 40C are connected to the respective superimposing parts of the second semiconductor portion 39. The seventh portion 40B is spaced from the sixth portion 333E of the third electrode 333 in the Y-axis direction. The seventh portion 40B extends in parallel with the sixth portion 333E, and accordingly, a distance between the seventh portion 40B and the sixth portion 333E is substantially fixed. The eighth portion 40C is spaced from the sixth portion 333E of the third electrode 333 in the Y-axis direction opposite (downward in FIG. 12) the seventh portion 40B (upward in FIG. 12). The eighth portion 40C extends in parallel with the sixth portion 333E, and accordingly, a distance between the eighth portion 40C and the sixth portion 333E is substantially fixed. The distance between the eighth portion 40C and the sixth portion 333E is substantially equal to the distance between the seventh portion 40B and the sixth portion 333E.

The third electrode 333 according to the present embodiment is not connected to, for example, electrodes, terminals, and wiring lines other than the semiconductor portions 331 and 39. That is, the third electrode 333 can be referred to as a floating node that is electrically isolated. Accordingly, the electric potential of the third electrode 333 is higher than the low level of electric potential of the second electrode 332 and is lower than the high level of electric potential of the seventh electrode 40 when the second transistor T302 is driven. That is, the electric potential of the third electrode 333 is between the electric potential of the second electrode 332 and the electric potential of the seventh electrode 40.

With this structure, the high level of electric potential is applied to the first electrode 330 and the sixth electrode 38, the level of electric potential of the seventh electrode 40 is set to the high level when the second transistor T302 is driven, and the level of electric potential of the second electrode 332 is set to the low level. Accordingly, the electrons move from the second electrode 332 that has the electric potential lower than that of the third electrode 333 to the third electrode 333 via the channel region of the first semiconductor portion 331, and the electrons move from the third electrode 333 that has the electric potential lower than that of the seventh electrode 40 to the seventh electrode 40 via the channel region of the second semiconductor portion 39. The paths along which the electrons move from the second electrode 332 to the third electrode 333 are divided into a path that extends from the second electrode 332 to the first portion 333B of the third electrode 333 and a path that extends from the second electrode 332 to the second portion 333C of the third electrode 333. The paths along which the electrons move from the third electrode 333 to the seventh electrode 40 are divided into a path that extends from the sixth portion 333E of the third electrode 333 to the seventh portion 40B of the seventh electrode 40 and a path that extends from the sixth portion 333E of the third electrode 333 to the eighth portion 40C of the seventh electrode 40. According to the present embodiment, the paths along which the electrons move are thus divided, and accordingly, the hot carrier is more unlikely to occur.

According to the present embodiment, the sixth electrode 38 the electric potential of which is equal to that of the first electrode 330, the second semiconductor portion 39 that is at least partly superimposed on the sixth electrode 38 with the gate insulating film interposed therebetween and that is composed of the semiconductor material, and the seventh electrode 40 that is located in a layer in which the second electrode 332 and the third electrode 333 are located, that is superimposed on parts of the second semiconductor portion 39, and that is connected to the second semiconductor portion 39 are included, the third electrode 333 includes the sixth portion 333E that is superimposed on a part of the second semiconductor portion 39 and that is connected to the second semiconductor portion 39, and the seventh electrode 40 includes the seventh portion 40B that is spaced from the sixth portion 333E and the eighth portion 40C that is spaced from the sixth portion 333E opposite the seventh portion 40B as described above. A voltage equal to or more than the threshold voltage of the second transistor T302 is applied to the first electrode 330 and the sixth electrode 38, and the channel regions are consequently created in the first semiconductor portion 331 and the second semiconductor portion 39. The electrons then move from the second electrode 332 to the first portion 333B of the third electrode 333, move from the second electrode 332 to the second portion 333C of the third electrode 333, subsequently move from the sixth portion 333E of the third electrode 333 to the seventh portion 40B of the seventh electrode 40, and move from the sixth portion 333E of the third electrode 333 to the eighth portion 40C of the seventh electrode 40. The paths along which the electrons move are thus divided, and accordingly, the hot carrier is more unlikely to occur.

Fifth Embodiment

A fifth embodiment will be described with reference to FIG. 13 or FIG. 14. In a case described according to the fifth embodiment, the structure of a second transistor T402 is changed from the structure according to the first embodiment described above. The duplicated description of structures, actions, and effects like to those according to the first embodiment described above is omitted.

Figure 14:
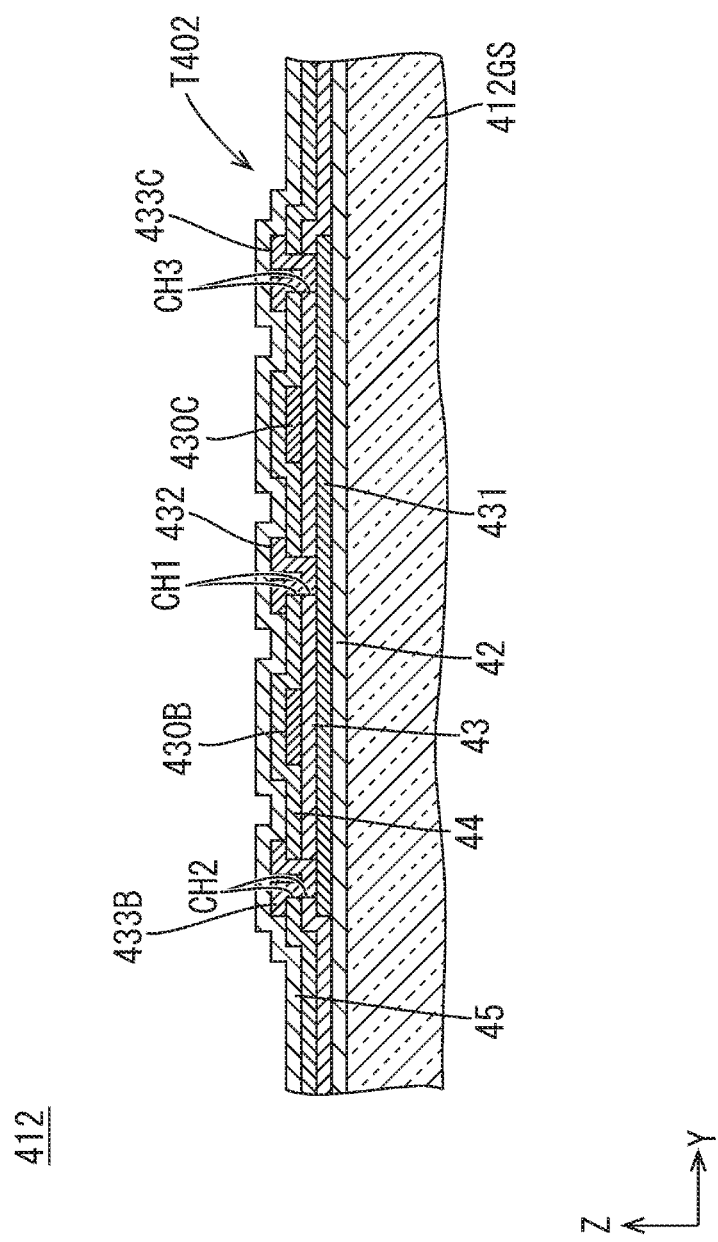
FIG. 14 is a sectional view of an array substrate according to the fifth embodiment taken along line xiv-xiv in FIG. 13.

As illustrated in FIG. 14, the second transistor T402 according to the present embodiment is a top gate transistor. Specifically, at least a base coating film 42, a semiconductor film that is included in a first semiconductor portion 431, a gate insulating film (a first insulating film) 43, a first metal film (a first conductive film) that is included in a first electrode 430, a first interlayer insulating layer (a second insulating film) 44, a second metal film (a second conductive film) that is included in a second electrode 432 and a third electrode 433, and a second interlayer insulating layer (a third insulating film) 45 are stacked on a glass substrate (a substrate) 412GS of an array substrate 412 in order from a lower layer. The semiconductor film is composed of, for example, low-temperature poly silicon (LTPS). The base coating film 42, the gate insulating film 43, the first interlayer insulating layer 44, and the second interlayer insulating layer 45 are composed of an inorganic material such as silicon oxynitride (SiNx) or silicon oxide (SiO2). The first electrode 430 composed of the first metal film is superimposed on the first semiconductor portion 431 composed of the semiconductor film at an upper layer with the gate insulating film 43 interposed therebetween.

Figure 13:
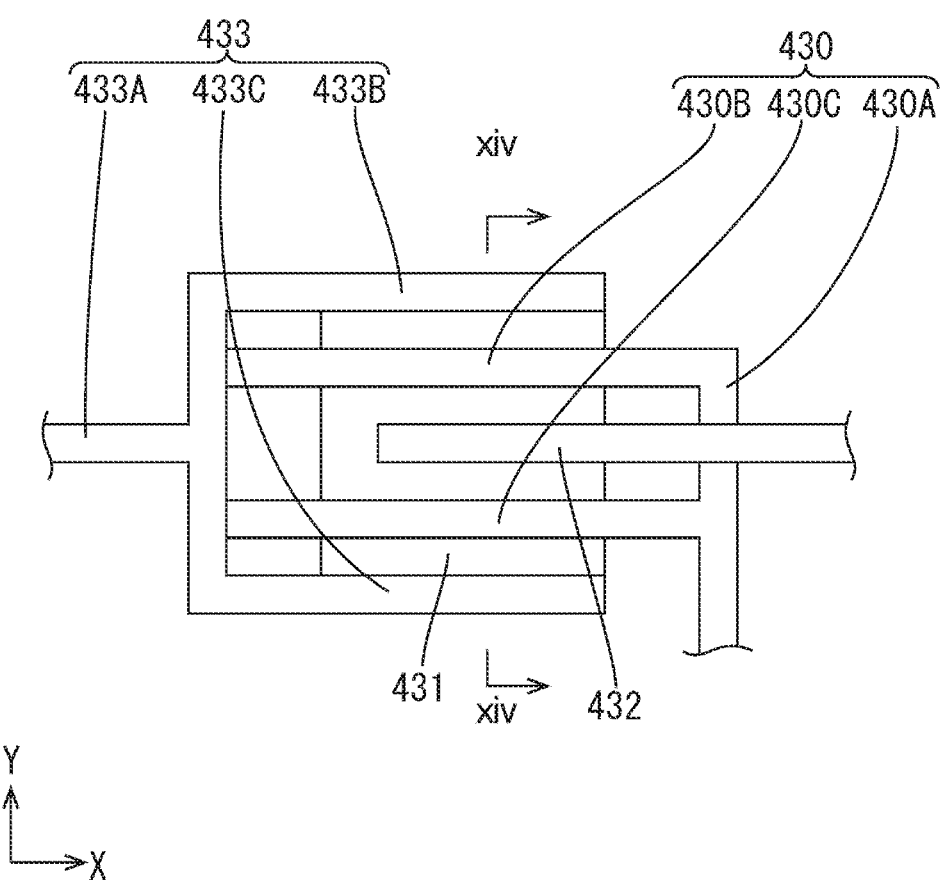
FIG. 13 is a plan view of a second transistor that is included in a unit circuit according to a fifth embodiment.

As illustrated in FIG. 13, the first electrode 430 has a two-way branch structure in a plan view. The first electrode 430 includes a base portion 430A, and a ninth portion 430B and a tenth portion 430C that branch from the base portion 430A. The base portion 430A is not superimposed on the first semiconductor portion 431. The ninth portion 430B and the tenth portion 430C are superimposed on the first semiconductor portion 431 and extend in a direction (the X-axis direction) in which the second electrode 432 extends. The ninth portion 430B is spaced from the second electrode 432 in the Y-axis direction. The ninth portion 430B extends in parallel with the second electrode 432, and accordingly, a distance between the ninth portion 430B and the second electrode 432 is substantially fixed. The tenth portion 430C is spaced from the second electrode 432 in the Y-axis direction opposite (downward in FIG. 13) the ninth portion 430B (upward in FIG. 13). The tenth portion 430C extends in parallel with the second electrode 432, and accordingly, a distance between the tenth portion 430C and the second electrode 432 is substantially fixed. The distance between the tenth portion 430C and the second electrode 432 is substantially equal to the distance between the ninth portion 430B and the second electrode 432.

As for the third electrode 433, as illustrated in FIG. 13, a first portion 433B is spaced from the ninth portion 430B of the first electrode 430 opposite (upward in FIG. 13) the second electrode 432 (downward in FIG. 13). As for the third electrode 433, a second portion 433C is spaced from the tenth portion 430C of the first electrode 430 opposite (downward in FIG. 13) the second electrode 432 (upward in FIG. 13). A distance between the first portion 433B and the ninth portion 430B is substantially equal to a distance between the second portion 433C and the tenth portion 430C.

As illustrated in FIG. 14, the gate insulating film 43 and the first interlayer insulating layer 44 have first contact holes CH1, second contact holes CH2, and third contact holes CH3. The gate insulating film 43 and the first interlayer insulating layer 44 have the first contact holes CH1 at positions at which the gate insulating film 43 and the first interlayer insulating layer 44 are superimposed on the second electrode 432 and the first semiconductor portion 431. The second electrode 432 and the first semiconductor portion 431 are connected to each other via the first contact holes CH1. The gate insulating film 43 and the first interlayer insulating layer 44 have the second contact holes CH2 at positions at which the gate insulating film 43 and the first interlayer insulating layer 44 are superimposed on the first portion 433B of the third electrode 433 and the first semiconductor portion 431. The first portion 433B of the third electrode 433 and the first semiconductor portion 431 are connected to each other via the second contact holes CH2. The gate insulating film 43 and the first interlayer insulating layer 44 have the third contact holes CH3 at positions at which the gate insulating film 43 and the first interlayer insulating layer 44 are superimposed on the second portion 433C of the third electrode 433 and the first semiconductor portion 431. The second portion 433C of the third electrode 433 and the first semiconductor portion 431 are connected to each other via the third contact holes CH3.

According to the present embodiment, the first semiconductor portion 431 is located at a lower layer of the gate insulating film (the first insulating film) 43, the first electrode 430 is located at an upper layer of the gate insulating film 43, the first interlayer insulating layer (the second insulating film) 44 is disposed at an upper layer of the first electrode 430 and at lower layers of the second electrode 432 and the third electrode 433 as described above. The gate insulating film 43 and the first interlayer insulating layer 44 have the first contact holes CH1 at the positions at which the gate insulating film 43 and the first interlayer insulating layer 44 are superimposed on the second electrode 432 and the first semiconductor portion 431, have the second contact holes CH2 at the positions at which the gate insulating film 43 and the first interlayer insulating layer 44 are superimposed on the first portion 433B and the first semiconductor portion 431, and have the third contact holes CH3 at the positions at which the gate insulating film 43 and the first interlayer insulating layer 44 are superimposed on the second portion 433C and the first semiconductor portion 431. The voltage is applied to the first electrode 430 that is located at the upper layer of the gate insulating film 43, and the channel region is consequently created in the first semiconductor portion 431 that is located at the lower layer of the gate insulating film 43. Along with this, the electrons move between the second electrode 432 and the third electrode 433 that are located in the upper layer of the first interlayer insulating layer 44. The electrons reach the channel region of the first semiconductor portion 431 from the second electrode 432 via the first contact holes CH1, subsequently move to the first portion 433B of the third electrode 433 via the second contact holes CH2, and move to the second portion 433C of the third electrode 433 via the third contact holes CH3.

Other Embodiments

Techniques disclosed in the present disclosure are not limited to the embodiments described above with reference to the drawings. Embodiments described below, for example, are included in a technical range.

(1) The third electrodes 33, 133, 233, 333, and 433 may have a branch structure in which four or more portions branch from the base portions 33A, 133A, and 433A. In this case, the second electrodes 32, 132, 232, 332, and 432 can have a branch structure in which three or more portions branch from the base portion 132A.

(2) In the structure describe according to the third embodiment, the third electrode 233 may have a three-way branch structure in a plan view. In this case, the second electrode 232 may have a two-way branch structure in a plan view, and two fourth electrodes 36 and two fifth electrodes 37 may be installed.

(3) In the structure described according to the fourth embodiment, a portion of the third electrode 333 that faces the second electrode 332 may have a three-way branch structure in a plan view, and a portion thereof that faces the seventh electrode 40 may have a two-way branch structure in a plan view. In this case, the second electrode 332 may have a two-way branch structure in a plan view, and the seventh electrode 40 may have a three-way branch structure in a plan view.

(4) In the structure described according to the fifth embodiment, a planar shape of each of the contact holes CH1, CH2, and CH3 may be, for example, a square shape or a circular shape. Other than these, a rectangular shape, an oval shape, or an elliptical shape may be acceptable. The numbers of the contact holes CH1, CH2, and CH3 that each of the second transistors T2, T102, T202, T302, and T402 has may be 1 or may be more than 1.

(5) Specific circuit structures of the unit circuits 20 that are included in the gate circuits 15 can be appropriately changed from those illustrated.

(6) The driver 13 may be mounted by using a chip-on-film (COF) method on a flexible substrate that is mounted on the array substrate 12 or 412 by using a film-on-glass (FOG) method.

(7) The array substrates 12 and 412 may include resin substrates composed of synthetic resin instead of the glass substrates 12GS and 412GS composed of glass.

(8) Only one of the gate circuits 15 in the X-axis direction may be disposed in the display region AA.

(9) A planar shape of the liquid crystal panel 10 may be a rectangular shape, a square shape, a circular shape, a semicircular shape, an oval shape, an elliptical shape, or a trapezoidal shape.

(10) The liquid crystal panel 10 may be a semi-transparent panel or a reflection panel that uses natural light for display instead of a transparent panel.

(11) A display panel of a kind different from that of the liquid crystal panel 10 may be acceptable.

The present disclosure contains subject matter related to that disclosed in Japanese Priority Patent Application JP 2023-051378 filed in the Japan Patent Office on Mar. 28, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transistor comprising:
   a first electrode;
   a first semiconductor portion that is at least partly superimposed on the first electrode and that is composed of a semiconductor material;
   a first insulating film that is interposed between the first electrode and the first semiconductor portion;
   a second electrode that is superimposed on a part of the first semiconductor portion and that is connected to the first semiconductor portion; and
   a third electrode that is located in a layer in which the second electrode is located, that is superimposed on a part of the first semiconductor portion, and that is connected to the first semiconductor portion; and
   a fourth electrode and a fifth electrode that are located in the layer in which the second electrode and the third electrode are located, that are superimposed on parts of the first semiconductor portion, and that are connected to the first semiconductor portion,
   wherein an electric potential of the second electrode is lower than that of the third electrode,
   wherein the third electrode includes a first portion that is spaced from the second electrode and a second portion that is spaced from the second electrode opposite the first portion,
   wherein the fourth electrode is sandwiched between the second electrode and the first portion and is spaced from the second electrode and the first portion,
   wherein the fifth electrode is sandwiched between the second electrode and the second portion and is spaced from the second electrode and the second portion, and
   wherein an electric potential of the fourth electrode and an electric potential of the fifth electrode are higher than that of the second electrode and are lower than that of the third electrode.

2. The transistor according to claim 1,
   wherein the third electrode includes a third portion that is spaced from the second portion opposite the first portion, and
   wherein the second electrode includes a fourth portion that is sandwiched between the first portion and the second portion and that is spaced from the first portion and the second portion and a fifth portion that is sandwiched between the second portion and the third portion and that is spaced from the second portion and the third portion.

3. The transistor according to claim 1, further comprising:
   a sixth electrode an electric potential of which is equal to that of the first electrode;
   a second semiconductor portion that is at least partly superimposed on the sixth electrode with the first insulating film interposed therebetween and that is composed of a semiconductor material; and
   a seventh electrode that is located in the layer in which the second electrode and the third electrode are located, that is superimposed on a part of the second semiconductor portion, and that is connected to the second semiconductor portion,
   wherein the third electrode includes a sixth portion that is superimposed on a part of the second semiconductor portion and that is connected to the second semiconductor portion, and
   wherein the seventh electrode includes a seventh portion that is spaced from the sixth portion and an eighth portion that is spaced from the sixth portion opposite the seventh portion.

4. The transistor according to claim 1,
   wherein the first electrode is located at a lower layer of the first insulating film,
   wherein the first semiconductor portion is located at an upper layer of the first insulating film, and
   wherein the second electrode and the third electrode are located at an upper layer of the first semiconductor portion.

5. The transistor according to claim 1,
   wherein the first semiconductor portion is located at a lower layer of the first insulating film, and the first electrode is located at an upper layer of the first insulating film, and
   wherein a second insulating film is disposed at an upper layer of the first electrode and at lower layers of the second electrode and the third electrode, and
   wherein the first insulating film and the second insulating film have first contact holes at positions at which the first insulating film and the second insulating film are superimposed on the second electrode and the first semiconductor portion, have second contact holes at positions at which the first insulating film and the second insulating film are superimposed on the first portion and the first semiconductor portion, and have third contact holes at positions at which the first insulating film and the second insulating film are superimposed on the second portion and the first semiconductor portion.

6. A circuit substrate comprising:
   the transistor according to claim 1; and
   a substrate on which the transistor is provided.

7. The circuit substrate according to claim 6, further comprising:
   a first electric potential applier that applies a first electric potential equal to or more than a threshold voltage of the transistor to the first electrode;
   a second electric potential applier that applies a second electric potential lower than the first electric potential to the second electrode; and
   a third electric potential applier that applies a third electric potential higher than the second electric potential to the third electrode.

8. A display device comprising:
   the circuit substrate according to claim 6; and
   a facing substrate that faces the circuit substrate.

* * * * *